(12) United States Patent
Matsumura et al.

(10) Patent No.: US 10,776,183 B2
(45) Date of Patent: Sep. 15, 2020

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Hidetoshi Matsumura, Sunnyvale, CA (US); Yasuhiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/801,511

(22) Filed: Nov. 2, 2017

(65) Prior Publication Data

US 2018/0129547 A1 May 10, 2018

(30) Foreign Application Priority Data

Nov. 10, 2016 (JP) .................. 2016-219443

(51) Int. Cl.
*G06F 3/00* (2006.01)
*G06F 9/54* (2006.01)
(Continued)

(52) U.S. Cl.
CPC .......... *G06F 9/542* (2013.01); *H04N 19/436* (2014.11); *H04N 19/51* (2014.11); *H04N 19/182* (2014.11)

(58) Field of Classification Search
CPC ....................................................... G06F 9/54
(Continued)

(56) References Cited

U.S. PATENT DOCUMENTS 6,522,167 B1 * 2/2003 Ansari ................ G06F 15/7867
326/39
9,235,407 B1 * 1/2016 Ye ........................... G06F 8/656
(Continued)

FOREIGN PATENT DOCUMENTS

JP 2000-255117 9/2000
JP 2005-323111 A 11/2005
(Continued)

OTHER PUBLICATIONS

Alexander (Sandy) Marquardt, Timing-driven placement for FPGAs. (Year: 2000).*
(Continued)

*Primary Examiner* — Lechi Truong
(74) *Attorney, Agent, or Firm* — Xsensus LLP

(57) ABSTRACT

An information processing apparatus includes, a programmable circuit that includes multiple areas into which logics are capable of being programmed, a memory, and a processor configured to, receive a request including information concerning a first process and a second process, calculate a first throughput corresponding to the first process and a second throughput corresponding to the second process based on data used in each of the first process and the second process, determine a first number of areas in which the first process is performed and a second number of areas in which the second process is performed, and program first logics to perform the first process in first areas among the multiple areas, and program second logics to perform the second process in second areas among the multiple areas, the first areas corresponding to the first number, the second areas corresponding to the second number.

12 Claims, 13 Drawing Sheets

(51) Int. Cl.
*H04N 19/436* (2014.01)
*H04N 19/51* (2014.01)
*H04N 19/182* (2014.01)

(58) Field of Classification Search
USPC .......................................................... 719/310
See application file for complete search history.

(56) References Cited

U.S. PATENT DOCUMENTS

| | | |
|---|---|---|
| 9,256,405 B1 * | 2/2016 | Modi ..................... G06F 8/35 |
| 9,735,782 B1 * | 8/2017 | Kumar ............. H03K 19/17748 |
| 2006/0061794 A1 | 3/2006 | Ito et al. |
| 2013/0049802 A1 * | 2/2013 | Choi ................ H03K 19/17756 |
| | | 326/38 |

FOREIGN PATENT DOCUMENTS

| | | |
|---|---|---|
| JP | 2006-088433 | 4/2006 |
| JP | 2008-242850 | 10/2008 |

OTHER PUBLICATIONS

Japanese Office Action dated Jul. 7, 2020, in corresponding Japanese Patent Application No. 2016-219443.

\* cited by examiner

| | REQ1 | REQ2 | REQ3 |
|---|---|---|---|
| k | 2 (PROCESS A AND PROCESS B) | 2 (PROCESS C AND PROCESS D) | 3 (PROCESS E, PROCESS F, AND PROCESS G) |
| N | 6 | 6 | 6 |
| T(n) | T(1)=3, T(2)=2 | T(1)=7, T(2)=3 | T(1)=4, T(2)=1, T(3)=2 |
| N(i) | – | N(1)=4.2, N(2)=1.8 | N(1)=3.4, N(2)=0.9, N(3)=1.7 |
| A(n) | A(1)=3, A(2)=2 | A(1)=4, A(2)=2 | A(1)=3, A(2)=1, A(3)=2 |
| LOGICS PROGRAMMED INTO BLOCKS UBLK | A / A / A / B / B / (empty) — UBLK | C / C / C / C / D / D — UBLK | E / E / E / F / G / G — UBLK |

FIG. 10

(NUMBER N OF BLOCKS UBLK = "6", n, i = 1, 2)

| | | REQ1 | REQ2 | REQ3 |
|---|---|---|---|---|
| INTRA PREDICTION ENCODING<br><br>(NUMBER OF PREDICTION MODES CAPABLE OF BEING PROCESSED PER UNIT TIME (PN(1) = "3") | SELECTED NUMBER NM(1) OF PREDICTION MODES | 4 | 6 | 7 |
| | CUMULATIVE TOTAL T(1) OF BLOCKS UBLK | 2 | 2 | 3 |
| | THEORETICAL NUMBER N(1) OF BLOCKS UBLK | – | 1.7 | 2.3 |
| | ALLOCATED NUMBER A(1) OF BLOCKS UBLK | 2 | 2 | 2 |
| INTRA PREDICTION ENCODING<br><br>(NUMBER OF MOTION VECTORS CAPABLE OF BEING PROCESSED PER UNIT TIME (PN(2) = "2") | SELECTED NUMBER NM(2) OF MOTION VECTORS | 6 | 9 | 10 |
| | CUMULATIVE TOTAL T(2) OF BLOCKS UBLK | 3 | 5 | 5 |
| | THEORETICAL NUMBER N(2) OF BLOCKS UBLK | – | 4.3 | 3.8 |
| | ALLOCATED NUMBER A(2) OF BLOCKS UBLK | 3 | 4 | 4 |

US 10,776,183 B2

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2016-219443, filed on Nov. 10, 2016, the entire contents of which are incorporated herein by reference.

FIELD

The embodiments discussed herein are related to an information processing apparatus and an information processing method.

BACKGROUND

Information processing apparatuses attract attention in recent years, in which programmable devices, such as field programmable gate arrays (FPGAs), capable of dynamically reconfiguring logics are caused to function as accelerators. For example, in a print processing apparatus that converts input data into drawing data for printing, a pipeline including multiple processing stages that perform the conversion process into the drawing data is built by the programmable device. For example, related technology is disclosed in Japanese Laid-open Patent Publication No. 2000-255117.

In conversion of input data described in an object description language into intermediate data for each drawing object and rendering of the intermediate data into bitmap data, logics that perform the rendering process for each attribute of the drawing object are programmed into each block in the programmable device. The times to perform the rendering process in the respective blocks are made equal to each other by programming logics for the rendering process, in which the rendering process has not been completed, into blocks in which the rendering process has been completed to perform the rendering process. For example, related technology is disclosed in Japanese Laid-open Patent Publication No. 2006-88433.

In a typical image processing apparatus, any of multiple logics for image processing is programmed into the programmable device based on a feature of an image determined from an input image and the image processing is performed using the programmed logics. For example, related technology is disclosed in Japanese Laid-open Patent Publication No. 2008-242850.

SUMMARY

According to an aspect of the invention, an information processing apparatus includes, a programmable circuit that includes multiple areas into which logics are capable of being programmed, a memory, and a processor coupled to the memory and the processor configured to, receive a request including information concerning a first process and a second process, calculate a first throughput corresponding to the first process and a second throughput corresponding to the second process based on data used in each of the first process and the second process, determine a first number of areas in which the first process is performed and a second number of areas in which the second process is performed based on the first throughput and the second throughput, and program first logics to perform the first process in first areas among the multiple areas, and program second logics to perform the second process in second areas among the multiple areas, the first areas corresponding to the first number, the second areas corresponding to the second number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a cumulative total, a theoretical number, and an allocated number determined from the flowchart illustrated in FIG. 2;

FIG. 10 illustrates an example of the cumulative total, the theoretical number, and the allocated number determined from the flowchart illustrated in FIG. 9;

DESCRIPTION OF EMBODIMENTS

When parallel processing of data is enabled, the processing time is reduced by programming logics to process the data into multiple blocks in a programmable device. However, when multiple kinds of processes are performed for data and the size of each process is varied with the feature of the data, no method of determining the number of blocks into which the logics to perform each of the multiple kinds of processes are to be programmed based on the feature of the data is proposed in related art.

Embodiments will herein be described with reference to the drawings.

Figure 1:
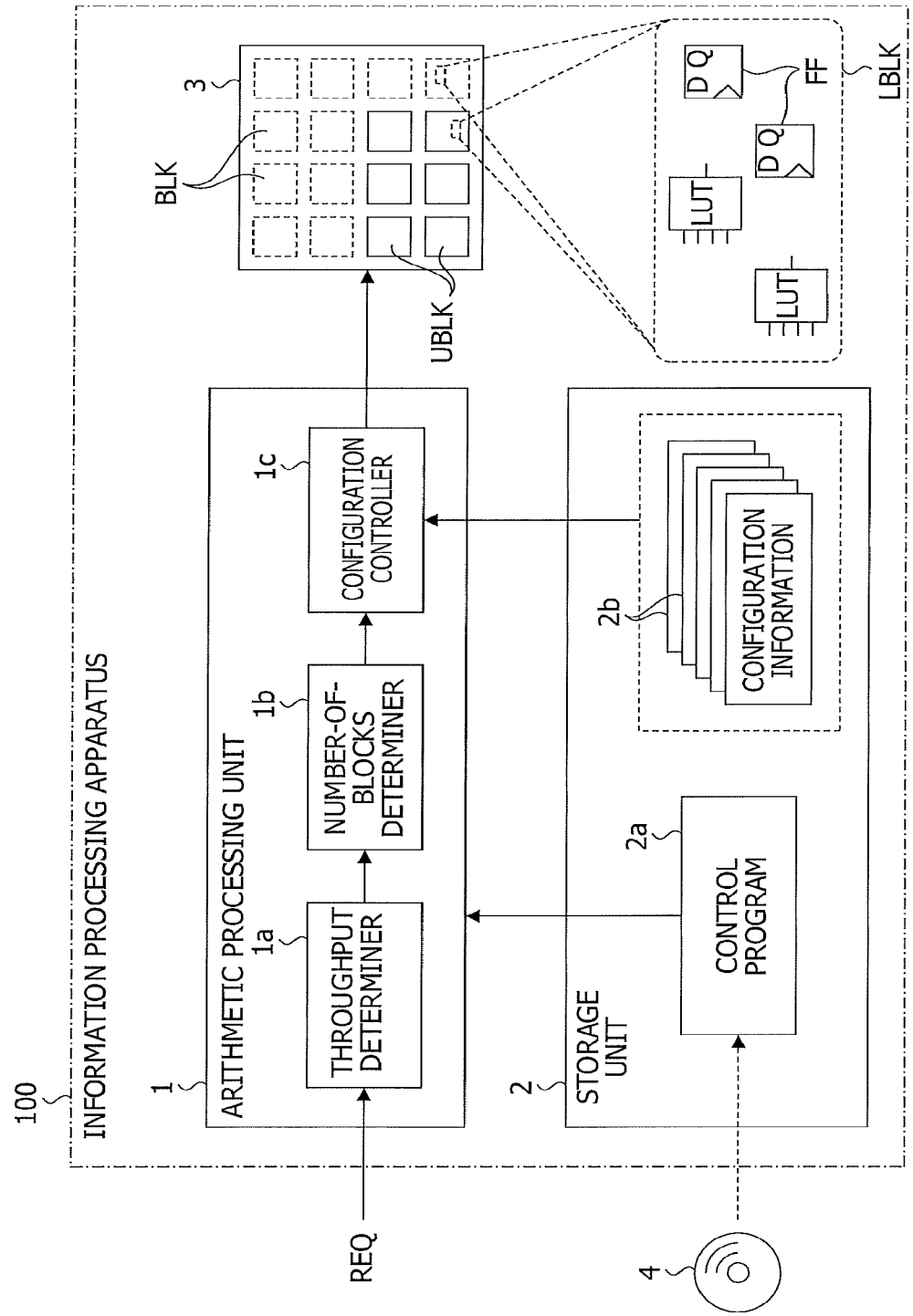
FIG. 1 illustrates an embodiment of an information processing apparatus, a method of controlling the information processing apparatus, and a control program of the information processing apparatus.

FIG. 1 illustrates an embodiment of an information processing apparatus, a method of controlling the information processing apparatus, and a control program of the information processing apparatus. Referring to FIG. 1, an information processing apparatus 100 is, for example, a server and includes an arithmetic processing unit 1, such as a central processing unit (CPU), a storage unit 2, such as a memory module, and a programmable unit 3, such as an FPGA. The information processing apparatus 100 may include, for example, a hard disk drive (HDD) and a communication interface, in addition to the components illustrated in FIG. 1.

The arithmetic processing unit 1 includes a throughput determiner 1a, a number-of-blocks determiner 1b, and a configuration controller 1c. The storage unit 2 includes a semiconductor memory, such as a synchronous dynamic random access memory (SDRAM), a static random access memory (SRAM), or a flash memory. In addition, the storage unit 2 includes a control program 2a and an area in which multiple pieces of configuration information 2b about logics to be programmed into the programmable unit 3 are stored. The area in which the pieces of configuration information 2b are stored in the storage unit 2 is an example of a configuration information storage unit that stores logics to be programmed into blocks UBLK to perform each of multiple kinds of processes and connection information used to connect the blocks UBLK into which the logics are programmed to each other. The pieces of configuration information 2b may be stored in a storage area other than the storage unit 2 in the information processing apparatus 100 or may be stored in a storage area outside the information processing apparatus 100.

The functions of the throughput determiner 1a, the number-of-blocks determiner 1b, and the configuration controller 1c are realized by, for example, a CPU core (not illustrated) in the arithmetic processing unit 1, which executes the control program 2a stored in the storage unit 2. The throughput determiner 1a, the number-of-blocks determiner 1b, and the configuration controller 1c may be installed in the information processing apparatus 100 as hardware (circuits).

The control program 2a may be stored in a computer-readable recording medium 4, such as a compact disc read only memory (CD-ROM), a digital versatile disc (DVD), or a universal serial bus (USB) memory. In this case, the control program 2a stored in the recording medium 4 is transferred from the recording medium 4 to the storage unit 2 via an input-output interface (not illustrated) provided in the information processing apparatus 100. The control program 2a may be transferred from the recording medium 4 to the HDD (not illustrated) and, then, may be transferred from the HDD to the storage unit 2.

The programmable unit 3 includes multiple logical blocks LBLK including multiple lookup tables LUT using SRAMs or the likes and multiple flip-flops FF, wiring (not illustrating) used to connect the logical blocks LBLK to each other, and a switch matrix (not illustrated). The programmable unit 3 also includes a block RAM (not illustrated) storing work data and so on. Writing logics into the lookup tables LUT in each logical block LBLK and connecting the lookup tables LUT to each other using the wiring and the switch matrix build a combination circuit. Inserting the flip-flops FF between the lookup tables LUT and connecting the lookup tables LUT to the block RAM using the wiring and the switch matrix, if desired, build a sequential circuit.

Multiple blocks BLK and UBLK into which logics are capable of being programmed and an inter-block connection circuit (not illustrated) connecting the blocks BLK and UBLK to each other are built on the logical blocks LBLK, the block RAM, the wiring, and the switch matrix in the programmable unit 3. The programmable unit 3 is capable of building 16 blocks BLK and UBLK in FIG. 1. Logics to perform the respective processes of the multiple kinds are programmed into six blocks UBLK indicated by solid lines by the configuration controller 1c. The blocks BLK and UBLK are examples of multiple areas into which the logics are capable of being programmed. The multiple blocks BLK and UBLK and the inter-block connection circuit connecting the blocks UBLK to each other may be physically built in the programmable unit 3.

Logics to perform other processes different from the multiple kinds of processes may be allocated for programming to at least one of ten blocks BLK indicated by broken lines, excluding the blocks UBLK in the programmable unit 3. For example, the other processes are performed using the results of the multiple kinds of processes or the multiple kinds of processes are performed using the results of the other processes. The number of the blocks BLK and UBLK in the programmable unit 3 is not limited to the one in the example illustrated in FIG. 1.

The throughput determiner 1a determines the throughput (the size of the process) of each of the multiple kinds of processes based on the feature of the data used for the multiple kinds of processes. The throughput determiner 1a is an example of a first determiner. For example, the throughput determiner 1a determines the cumulative total of the blocks UBLK used to perform each of the multiple kinds of processes without degrading the performance or the quality as the throughput.

The data used for the multiple kinds of processes is supplied from the outside of the information processing apparatus 100 in response to a processing request REQ. When the data is image data, the feature of the data is indicated by, for example, the rate of content of letters, pictures, or graphics in the image. When the data is video image data, the feature of the data is indicated by the positional relationship of similar pixels in the image or the feature (the direction, the speed, or the like) of a motion of an object in the image. When the data is numerical data used in arithmetic processing, statistical processing, or the like, the feature of the data is indicated by, for example, the data size or the numerical expression used in the processing.

The number-of-blocks determiner 1b determines the number of the blocks UBLK into which the logics are to be programmed for each of the multiple kinds of processes based on the throughput (for example, the cumulative total of the blocks UBLK used for each of the multiple kinds of processes) determined by the throughput determiner 1a. The number-of-blocks determiner 1b is an example of a second determiner. For example, the number-of-blocks determiner 1b determines the number of the UBLKs into which the logics are to be programmed for each of the multiple kinds of processes based on the ratio of the cumulative totals if the sum of the cumulative totals of the blocks UBLK used for the respective processes of the multiple kinds is greater than the number of the blocks UBLK. How to determine the number of the blocks UBLK into which the logics are to be programmed will be described below with reference to FIG. 3.

The configuration controller 1c reads out the configuration information 2b corresponding to each of the multiple kinds of processes performed in the programmable unit 3 from the storage unit 2 based on the number of the blocks UBLK determined by the number-of-blocks determiner 1b and programs the configuration information 2b that is read out into the blocks UBLK. The configuration information 2b includes logical information indicating the logics to be programmed into each block UBLK to perform each of the multiple kinds of processes and the connection information used to connect the multiple blocks UBLK into which the logics are programmed for each of the multiple kinds of processes to each other.

For example, when a process A is performed in four blocks UBLK, the configuration controller 1c programs the logics to perform the process A into each of the four blocks UBLK and connects the four blocks UBLK to each other based on the connection information. Similarly, when a process B is performed in two blocks UBLK, the configuration controller 1c programs the logics to perform the process B into each of the two blocks UBLK and connects the two blocks UBLK to each other based on the connection information. In these cases, the four blocks UBLK perform the process A in parallel and the two blocks UBLK perform the process B in parallel.

The performance in the case in which the process A is performed using four blocks UBLK is four times of that in the case in which the process A is performed using one block UBLK. As described above, the processing performance is capable of being adjusted based on the number of the blocks UBLK performing the process in parallel. Determining the number of the blocks UBLK into which the logics are to be programmed for each of the multiple kinds of processes and performing the parallel processing by the throughput determiner 1a and the number-of-blocks determiner 1b enables the multiple kinds of processes to be performed in a balanced manner.

After programming the pieces of configuration information 2b into certain blocks UBLK in the programmable unit 3, the arithmetic processing unit 1 causes the programmable unit 3 to function as an accelerator to perform data processing, such as image processing, the arithmetic processing, or the statistical processing.

Figure 2:
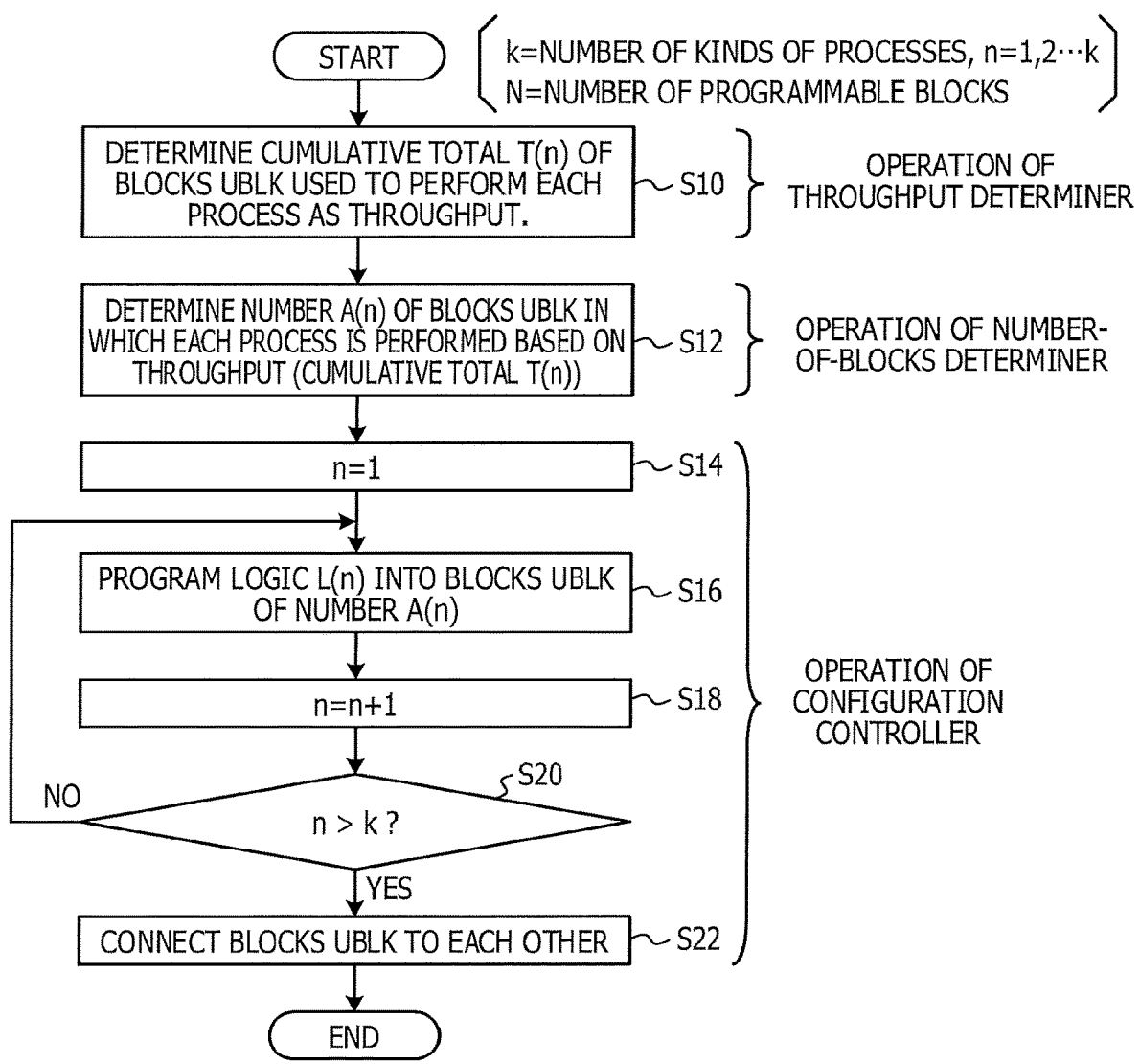
FIG. 2 is a flowchart illustrating an exemplary operational process of a throughput determiner, a number-of-blocks determiner, and a configuration controller illustrated in FIG. 1.

FIG. 2 is a flowchart illustrating an exemplary operational process of the throughput determiner 1a, the number-of-blocks determiner 1b, and the configuration controller 1c illustrated in FIG. 1. In other words, FIG. 2 illustrates an exemplary method of controlling the information processing apparatus 100 and an exemplary control program of the information processing apparatus 100. The operational process illustrated in FIG. 2 is started upon reception of the processing request REQ by the information processing apparatus 100. Referring to FIG. 2, reference letter k denotes the number of the kinds of the processes. When the process A and the process B are performed, k is equal to two (k="2"). Reference letter n denotes the number to be allocated to each process for identification and is also used as a counter value. Reference letter N denotes the number of the blocks UBLK into which the logics are capable of being programmed to perform the multiple kinds of processes and is equal to six in FIG. 1 (N="6").

Referring to FIG. 2, in Step S10, the throughput determiner 1a determines the throughput of each of the multiple kinds of processes based on processing data received in response to the processing request REQ. For example, the throughput determiner 1a determines the cumulative total T(n) of the blocks UBLK used to perform each of the multiple kinds of processes as the throughput.

In Step S12, the number-of-blocks determiner 1b determines the number A(n) of the blocks UBLK in which each of the multiple kinds of processes is performed based on the determined throughput (the cumulative total T(n)) so that the total number of the blocks UBLK in which the multiple kinds of processes are performed is smaller than or equal to N. The number-of-blocks determiner 1b notifies the configuration controller 1c of the determined numbers A(n) of the blocks UBLK in association with the multiple kinds of processes. The number A(n) is also referred to as an allocated number A(n) in the following description.

The number-of-blocks determiner 1b determines the allocated number A(n) while keeping the ratio of the cumulative totals T(n) of the respective processes, determined in Step S10. Accordingly, even if the sum of the cumulative totals T(n) is greater than the number of the blocks UBLK, the allocated number A(n) is capable of being set in association with the ratio of the cumulative totals T(n) and, thus, the multiple kinds of processes are capable of being performed in a balanced manner.

In Step S14, the configuration controller 1c sets the counter value n to "1". In Step S16, the configuration controller 1c programs a logic L(n) into the blocks UBLK of the number A(n). In Step S18, the configuration controller is increments the counter value n by "1".

In Step S20, the configuration controller 1c determines whether the counter value n exceeds k. If the counter value n exceeds k (YES), the process goes to Step S22. If the counter value n is lower than or equal to k (NO), the process goes back to Step S16 in order to program the logic L(n) to perform another process. In Step S22, the configuration controller is connects the blocks UBLK of a certain number into which the logic L(1) to the logic L(n) are programmed to each other. Then, the process illustrated in FIG. 2 is terminated.

FIG. 3 illustrates an example of the cumulative total T(n), a theoretical number N(i), and the allocated number A(n) determined from the flowchart illustrated in FIG. 2. In an operation corresponding to a processing request REQ1, two processes A and B are performed using six blocks UBLK (N="6"). The throughput determiner 1a determines the cumulative total T(1)="3" corresponding to the process A and the cumulative total T(2)="2" corresponding to the process B. Since the sum of the cumulative totals T(1) and T(2) is smaller than the number N of the blocks UBLK, the number-of-blocks determiner 1b determines the cumulative total T(n) to be the allocated number A(n) of the blocks UBLK into which the logics to perform the processes A and B are to be programmed. This causes the logics to perform the process A to be programmed into three blocks UBLK and the logics to perform the process B to be programmed into two blocks UBLK.

In an operation corresponding to a processing request REQ2, two processes C and D are performed using six blocks UBLK. The throughput determiner 1a determines the cumulative total T(1)="7" corresponding to the process C and the cumulative total T(2)="3" corresponding to the process D. Since the sum of the cumulative totals T(1) and T(2) is greater than the number N of the blocks UBLK, the number-of-blocks determiner 1b determines the allocated number A(n) of the blocks UBLK into which the logics to perform the processes C and D are to be programmed based on the ratio of the cumulative totals T(1) and T(2).

For example, the number-of-blocks determiner 1b substitutes the number N of the blocks UBLK and the cumulative total T(n) into Equation (1) to determine the number (the theoretical number N(i)) of the blocks UBLK into which the logics of the each process are to be programmed to one decimal place.

$$N(i) = N \times \frac{T(i)}{\sum_{n=1}^{k} T(n)} \quad (i = 1, 2, \ldots, k) \tag{1}$$

The theoretical number N(1) of the process C is 4.2 (=6×7/10) and the theoretical number N(2) of the process D is 1.8 (=6×3/10). The number-of-blocks determiner 1b rounds off the first decimal place of each theoretical number N(i) to set the allocated number A(1) of the process C to "4" and set the allocated number A(2) of the process D to "2". This causes the logics to perform the process C to be programmed into four blocks UBLK and the logics to perform the process D to be programmed into two blocks UBLK.

However, for example, if the theoretical number N(1) is "4.5" and the theoretical number N(2) is "1.5", the allocated number A(1) is "5", the allocated number A(2) is "2", and the sum of the allocated numbers A(n) is greater than the total number N of the blocks UBLK. Accordingly, if the sum of the allocated numbers A(n) exceeds the total number N of the blocks UBLK, the number-of-blocks determiner 1b rounds down one theoretical number N(i), instead of rounding up, to adjust the sum of the allocated numbers A(n) so as to be smaller than or equal to the total number N of the blocks UBLK.

In an operation corresponding to a processing request REQ3, three processes E, F, and G are performed using six blocks UBLK. The throughput determiner 1a determines the cumulative total T(1)="4" corresponding to the process E, the cumulative total T(2)="1" corresponding to the process F, and the cumulative total T(3)="2" corresponding to the process G. Since the sum of the cumulative totals T(1), T(2), and T(3) is greater than the number N of the blocks UBLK, the number-of-blocks determiner 1b determines the theoretical number N(i) using Equation (1).

The theoretical number N(1) of the process E is 3.43 (=6×4/7), the theoretical number N(2) of the process F is 0.86 (=6×1/7), and the theoretical number N(3) of the process G is 1.71 (=6×2/7). The number-of-blocks determiner 1b rounds off the first decimal place of each theoretical number N(i) to set the allocated number A(1) of the process E to "3", set the allocated number A(n) of the process F to "1", and set the allocated number A(3) of the process G to "2".

If the theoretical number N(i) is smaller than "1", the first decimal place is rounded up, instead of rounding off, and the allocated number A(n) is set to "1". This causes the logics to perform the process E to be programmed into three blocks UBLK, the logics to perform the process F to be programmed into one block UBLK, and the logics to perform the process G to be programmed into two blocks UBLK.

Figure 4:
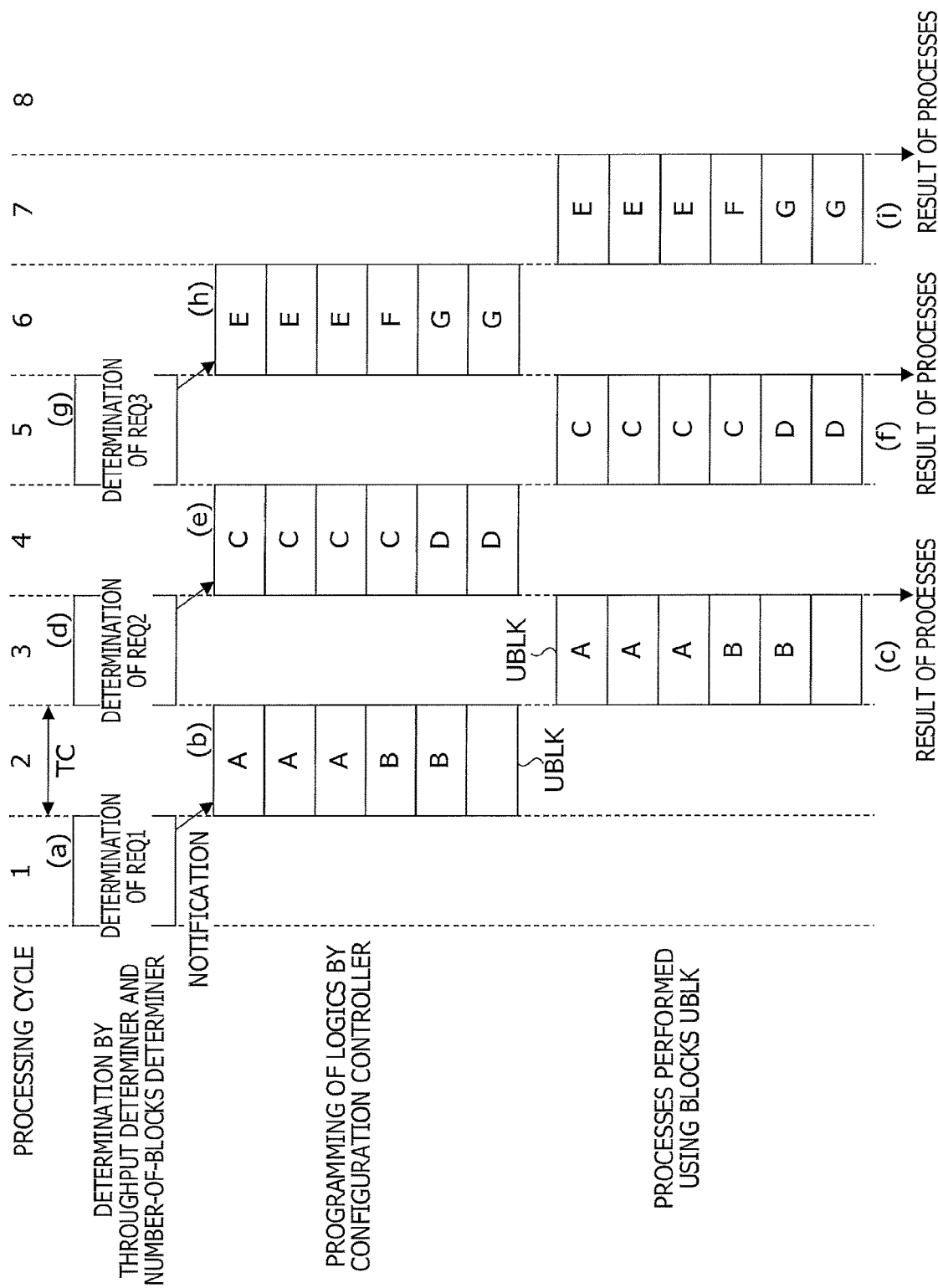
FIG. 4 illustrates exemplary operations of the information processing apparatus illustrated in FIG. 1.

FIG. 4 illustrates exemplary operations of the information processing apparatus 100 illustrated in FIG. 1. FIG. 4 illustrates the operations when the information processing apparatus 100 sequentially receives the processing requests REQ1, REQ2, and REQ3 illustrated in FIG. 3. The processes A, B, C, D, E, F, and G performed by the logics programmed in the programmable unit 3 are completed within a cycle time TC allocated to each processing cycle. In other words, since the number of blocks performing the process in parallel is adjusted depending on the size of the process, the processes A, B, C, D, E, and G excluding the process F are capable of being completed within one cycle time TC.

In a processing cycle 1, the throughput determiner 1a and the number-of-blocks determiner 1b perform the determination of the processing request REQ1 to determine the allocated number A(n) of the blocks UBLK into which the logics are to be programmed for each of the processes A and B ((a) in FIG. 4). In a processing cycle 2, the configuration controller 1c programs the logics to perform the processes A and B into the blocks UBLK based on the allocated number A(n) determined by the number-of-blocks determiner 1b and programs the connection information between the blocks UBLK into the programmable unit 3 ((b) in FIG. 4). Then, in a processing cycle 3, the processes A and B are performed in parallel using the multiple blocks UBLK and the result of the processes is output ((c) in FIG. 4). For example, the result of the processes is transferred to at least one of the other blocks BLK excluding the blocks UBLK and the subsequent process is performed in the other block BLK after a processing cycle 4.

In the processing cycle 3, the throughput determiner 1a and the number-of-blocks determiner 1b perform the determination of the processing request REQ2 to determine the allocated number A(n) of the blocks UBLK into which the logics are to be programmed for each of the processes C and D ((d) in FIG. 4). In the processing cycle 4, the configuration controller 1c programs the logics to perform the processes C and D into the blocks UBLK based on the allocated number A(n) determined by the number-of-blocks determiner 1b and programs the connection information between the blocks UBLK into the programmable unit 3 (e) in FIG. 4). Then, in a processing cycle 5, the processes C and D are performed in parallel using the multiple blocks UBLK and the result of the processes is output ((f) in FIG. 4). For example, the result of the processes is transferred to the other block BLK and the subsequent process is performed in the other block BLK after a processing cycle 6.

In the processing cycle 5, the throughput determiner 1a and the number-of-blocks determiner 1b perform the determination of the processing request REQ3 to determine the allocated number A(n) of the blocks UBLK into which the logics are to be programmed for each of the processes E, F, and G ((g) in FIG. 4). In the processing cycle 6, the configuration controller 1c programs the logics to perform the processes E, F, and G into the blocks UBLK based on the allocated number A(n) determined by the number-of-blocks determiner 1b and programs the connection information between the blocks UBLK into the programmable unit 3 ((h) in FIG. 4). Then, in a processing cycle 7, the processes E, F, and G are performed in parallel using the multiple blocks UBLK and the result of the processes is output ((i) in FIG. 4). For example, the result of the processes is transferred to the other block BLK and the subsequent process is performed in the other block BLK after a processing cycle 8 (not illustrated).

The process C is performed using four blocks UBLK smaller than the cumulative total T(1) (="7") and the process D is performed using two blocks UBLK smaller than the cumulative total T(2) (="3"). Similarly, the process E is performed using three blocks UBLK smaller than the cumulative total T(1) (="4"). Accordingly, the accuracy of the processes C, D, and E is lower than the accuracy that has been originally expected. In other words, the operations in FIG. 4 are adopted when the result of the processes is output without any delay even if the accuracy of the processes is sacrificed.

Figure 5:
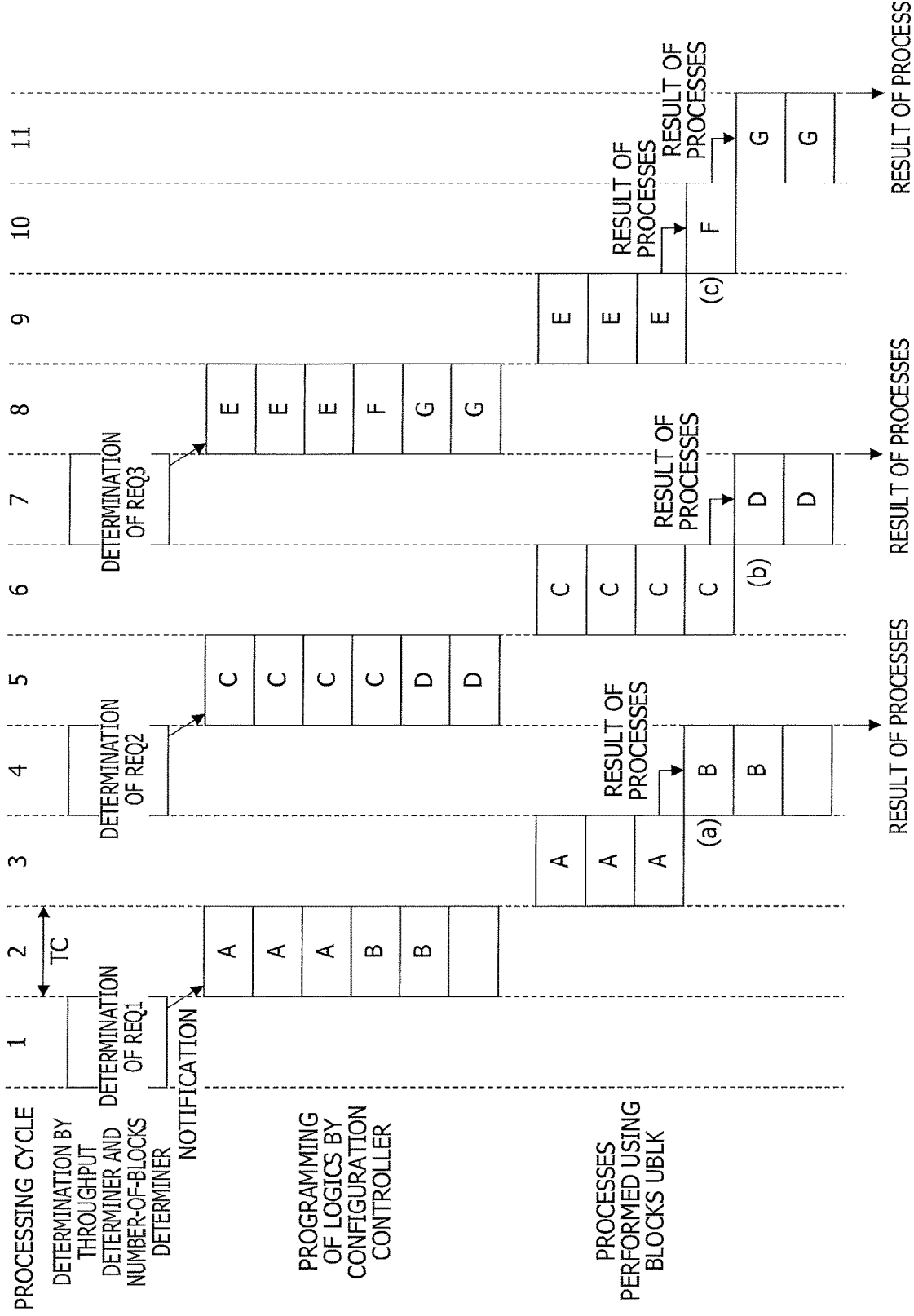
FIG. 5 illustrates other exemplary operations of the information processing apparatus illustrated in FIG. 1.

FIG. 5 illustrates other exemplary operations of the information processing apparatus 100 illustrated in FIG. 1. A detailed description of the same operations as those in FIG. 4 or operations similar to those in FIG. 4 is omitted herein. The operations of the throughput determiner 1a, the number-of-blocks determiner 1b, and the configuration controller 1c are the same as those in FIG. 4 except that different processing cycles are performed. In the operations illustrated in FIG. 5, the processes corresponding to the processing request REQ (REQ1, REQ2, or REQ3) are performed in series. The operations in FIG. 5 are adopted when the result of the processes is output without any delay even if the accuracy of the processes is sacrificed, like the operations illustrated in FIG. 4.

In the operation corresponding to the processing request REQ1, the process A is performed in the processing cycle 3 and, then, the process B is performed in the processing cycle 4 using the result of the process A ((a) in FIG. 5). In the operation corresponding to the processing request REQ2, the process C is performed in the processing cycle 6 and, then, the process D is performed in the processing cycle 7 using the result of the process C ((b) in FIG. 5). In the operation corresponding to the processing request REQ3, the process E is performed in a processing cycle 9 and, then, the process F is performed in a processing cycle 10 using the result of the process E and the process G is performed in a processing cycle 11 using the result of the process F ((c) in FIG. 5).

Figure 6:
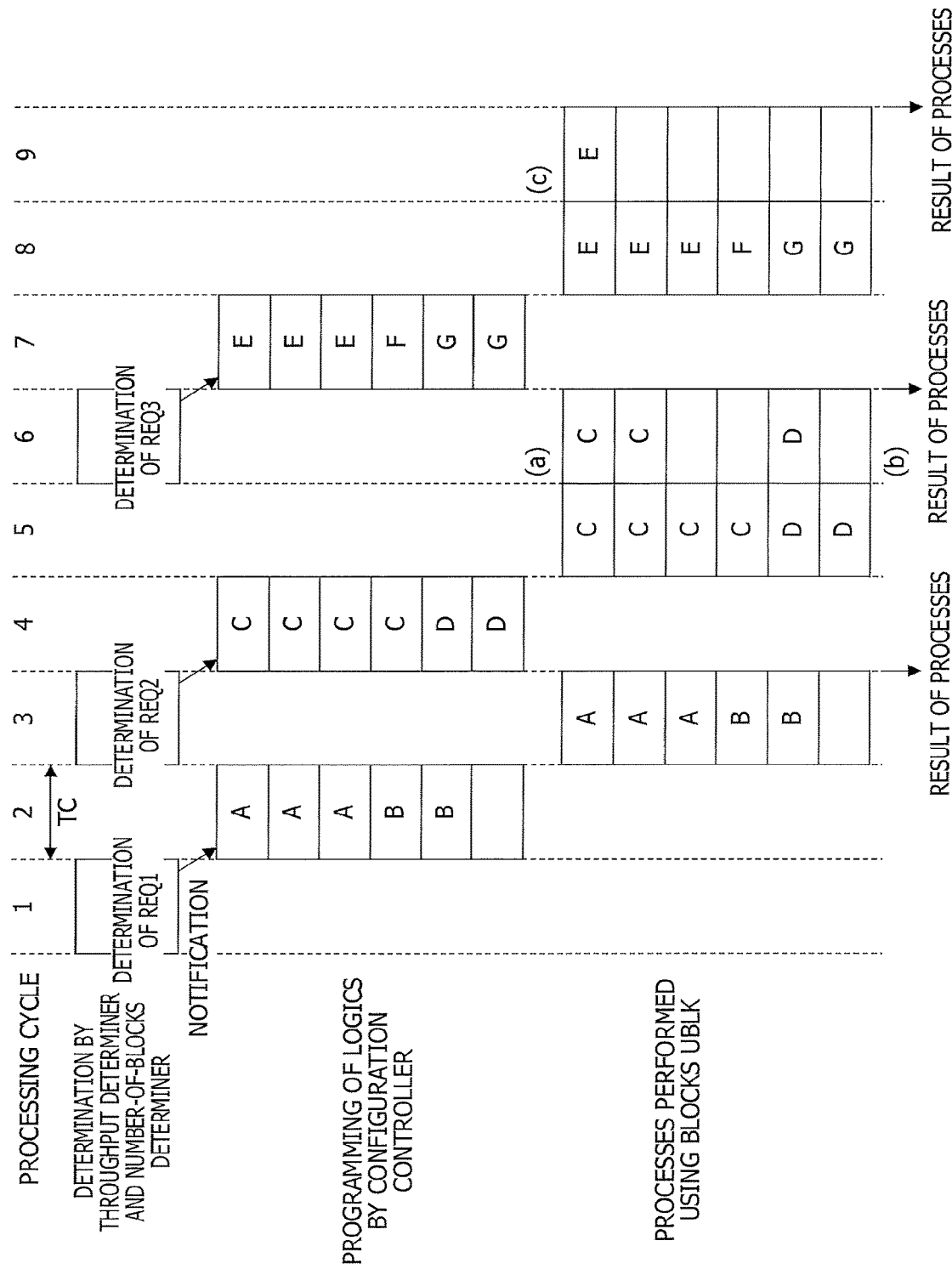
FIG. 6 illustrates other exemplary operations of the information processing apparatus illustrated in FIG. 1.

FIG. 6 illustrates other exemplary operations of the information processing apparatus 100 illustrated in FIG. 1. A detailed description of the same operations as those in FIG. 4 or operations similar to those in FIG. 4 is omitted herein. The operations of the throughput determiner 1a, the number-of-blocks determiner 1b, and the configuration controller 1c are the same as those in FIG. 4 except that different processing cycles are performed and the operations up the processing cycle 4 are the same as those in FIG. 4.

In the operations illustrated in FIG. 6, the processes corresponding to the processing request REQ (REQ1, REQ2, or REQ3) are performed in parallel, as in the operations in FIG. 4. In addition, in the operations illustrated in FIG. 6, each process is performed using the logics programmed into the blocks UBLK and using the blocks UBLK of the number equal to the cumulative total T(n). However, the logics are programmed into the blocks UBLK in accordance with the allocated number A(n) determined by the throughput determiner 1a.

Accordingly, four blocks UBLK perform the process C in parallel in the processing cycle 5 and, then, two blocks UBLK perform the additional process C in parallel in the processing cycle 6 ((a) in FIG. 6). Similarly, two blocks UBLK perform the process D in parallel in the processing cycle 5 and, then, one block UBLK performs the additional process D in the processing cycle 6 ((b) in FIG. 6). The result of the processes C and D is output after the process in the processing cycle 6 is completed.

Three blocks UBLK perform the process E in parallel in the processing cycle 8 and, then, one block UBLK performs the additional process E in the processing cycle 9 ((c) in FIG. 6). The result of the processes E, F, and G is output after the process in processing cycle 9 is completed. As described above, the operations illustrated in FIG. 6 are adopted when the accuracy of the processes, requested in the processing request REQ, is desirably ensured even if the output of the result of the processes is delayed.

Figure 7:
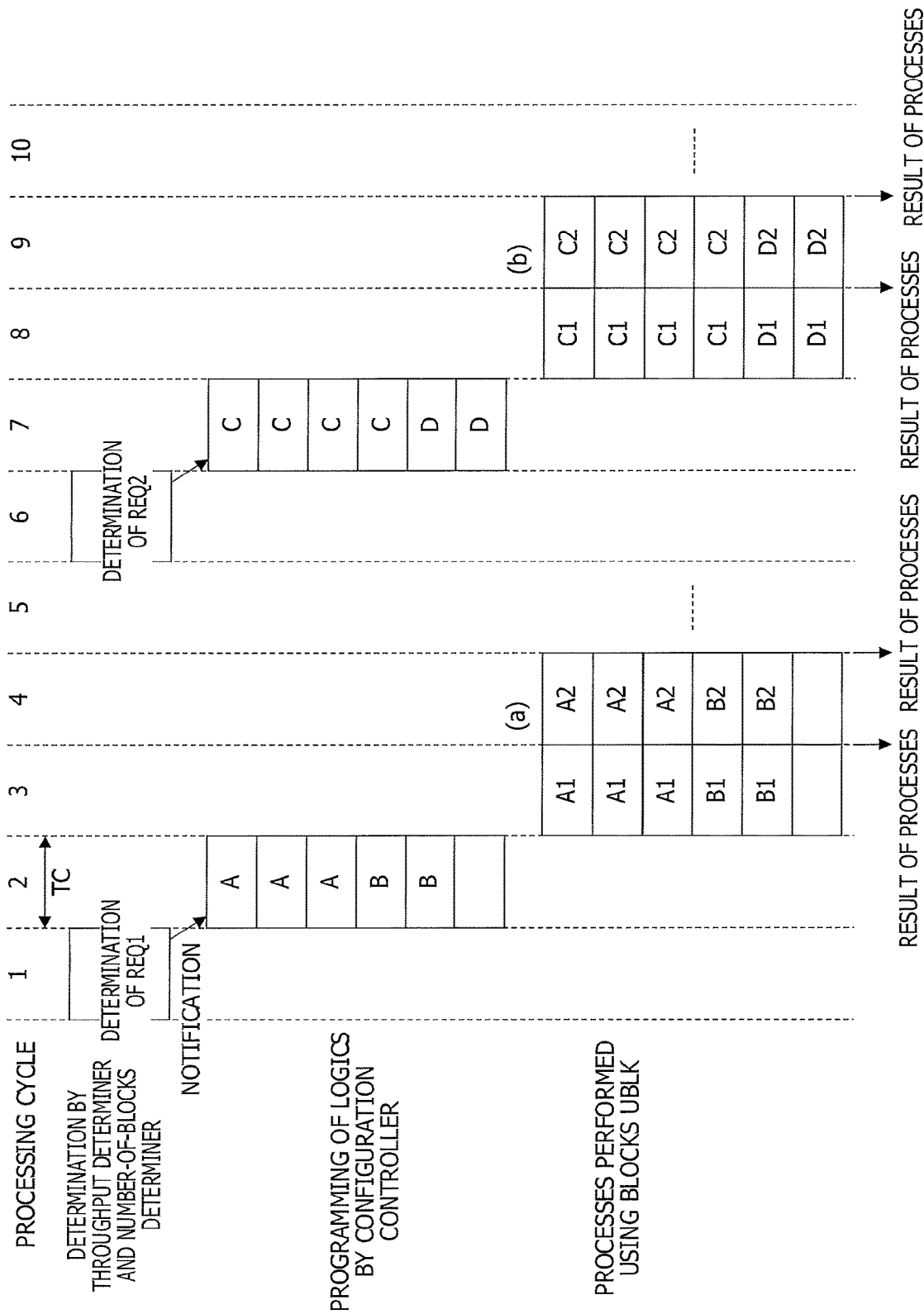
FIG. 7 illustrates other exemplary operations of the information processing apparatus illustrated in FIG. 1.

FIG. 7 illustrates other exemplary operations of the information processing apparatus 100 illustrated in FIG. 1. A detailed description of the same operations as those in FIG. 4 or operations similar to those in FIG. 4 is omitted herein. The operations of the throughput determiner 1a, the number-of-blocks determiner 1b, and the configuration controller 1c are the same as those in FIG. 4 except that different processing cycles are performed. In the operations illustrated in FIG. 7, multiple pieces of processing data corresponding to the processing request REQ (REQ1, REQ2, or REQ3) are supplied to the information processing apparatus 100 and the process is performed multiple times. The operations illustrated in FIG. 7 are adopted when the result of the processes is output without any delay even if the accuracy of the processes is sacrificed, like the operations illustrated in FIG. 4.

In the operations illustrated in FIG. 7, processes A1 and B1, processes A2 and B2, and so on are sequentially performed after the processing cycle 3 using the pieces of data sequentially supplied in response to the processing request REQ1 ((a) in FIG. 7). Similarly, processes C1 and D1, processes C2 and D2, and so on are sequentially performed after the processing cycle 8 using the pieces of data sequentially supplied in response to the processing request REQ2 ((b) in FIG. 7). Processes E1, F1, and G1, processes E2, F2, and G2, and so on are sequentially performed in the subsequent processing cycles using the pieces of data sequentially supplied in response to the processing request REQ3 illustrated in FIG. 4 although the processes E1, F1, and G1, processes E2, F2, and G2, and so on are omitted in FIG. 7.

In the embodiment described above with reference to FIG. 1 to FIG. 7, when the multiple kinds of processes for the data the feature of which is varied are performed using the blocks UBLK of a certain number into which the logics are capable of being programmed, the throughput determiner 1a determines the throughput of each of the multiple kinds of processes. The number-of-blocks determiner 1b determines the number of the blocks UBLK into which the logics are to be programmed for each of the multiple kinds of processes based on the throughput determined by the throughput determiner 1a. This enables the multiple kinds of processes to be performed in a balanced manner also when the sizes of the multiple kinds of processes are varied with the data.

If the cumulative total T(n) of the blocks UBLK for each of the multiple kinds of processes, determined by the throughput determiner 1a, is greater than the number of the blocks UBLK, the number-of-blocks determiner 1b determines the number of the blocks UBLK into which the logics are to be programmed for each of the multiple kinds of processes based on the ratio of the cumulative totals T(n). This enables the multiple kinds of processes to be performed in a balanced manner in accordance with the ratio of the throughputs even if the cumulative total T(n) is greater than the number of the blocks UBLK.

Figure 8:
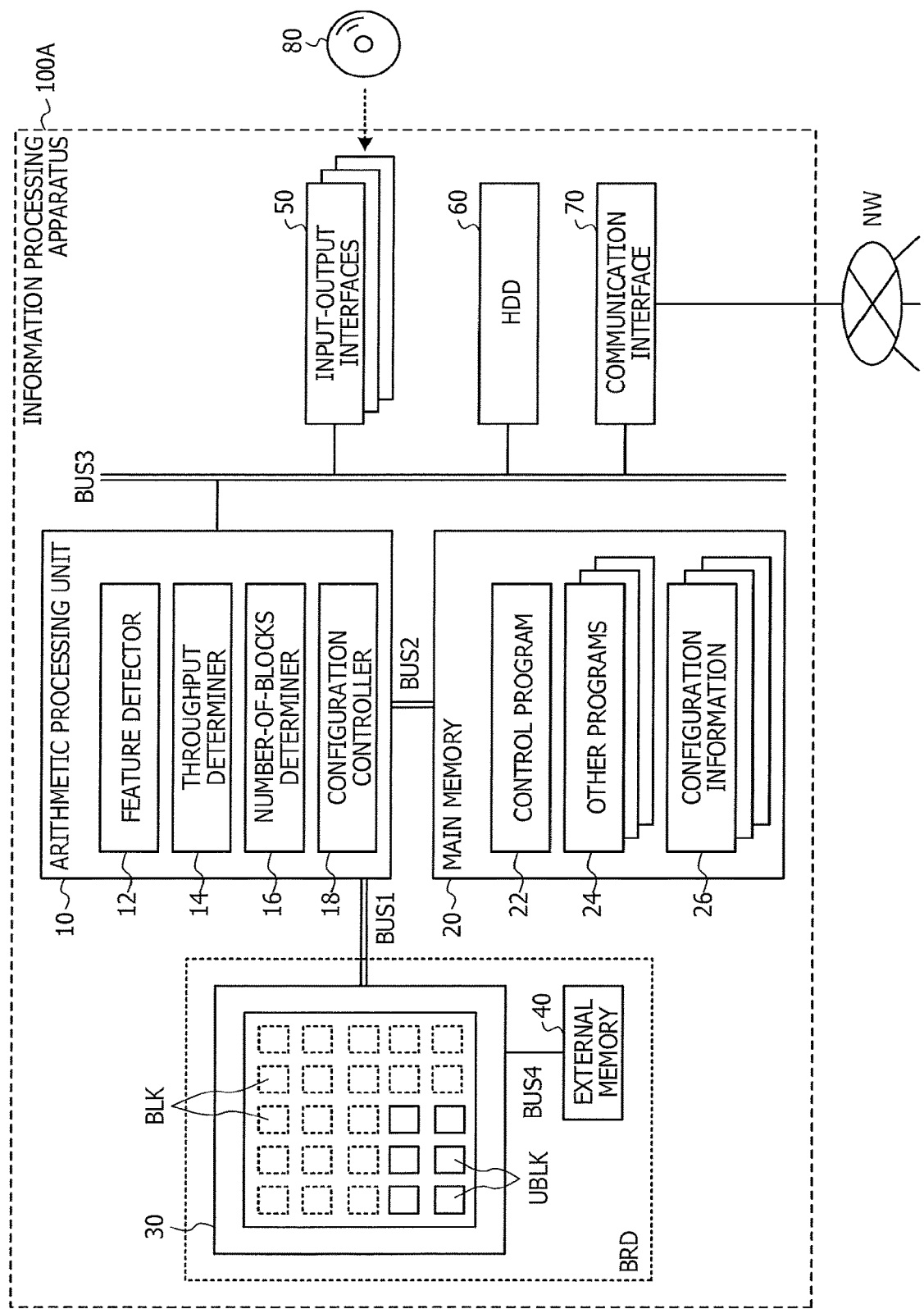
FIG. 8 illustrates another embodiment of an information processing apparatus, a method of controlling the information processing apparatus, and a control program of the information processing apparatus.

FIG. 8 illustrates another embodiment of an information processing apparatus, a method of controlling the information processing apparatus, and a control program of the information processing apparatus. A detailed description of the same components as those described in the embodiment illustrated in FIG. 1 or components similar to those described in the embodiment illustrated in FIG. 1 is omitted herein. Referring to FIG. 8, an information processing apparatus 100A is, for example, a server. The information processing apparatus 100A includes an arithmetic processing unit 10, such as a CPU, a main memory 20, a programmable unit 30, such as an FPGA, an external memory 40, input-output interfaces 50, an HDD 60, and a communication interface 70. For example, the information processing apparatus 100A functions as a video image encoding apparatus that performs encoding of a video image by causing the programmable unit 30 to function as an accelerator, as described below with reference to FIG. 12. The information processing apparatus 100A may cause the programmable unit 30 to function as an accelerator that performs other image processing other than the encoding of a video image or the data processing, such as the arithmetic processing or the statistical processing.

The programmable unit 30 has the same configuration as that of the programmable unit 3 illustrated in FIG. 1 except the number of the blocks UBLK in the programmable unit 30 is different from that in the programmable unit 3. Specifically, the programmable unit 30 includes the multiple logical blocks LBLK, the block RAM, the wiring, and the switch matrix, described above with reference to FIG. 1. The multiple blocks BLK and UBLK into which logics are capable of being programmed and the inter-block connection circuit (not illustrated) are built on the logical blocks LBLK, the block RAM, the wiring, and the switch matrix. The logics are varied depending on the feature of the data to be processed in the blocks UBLK of a certain number (six in FIG. 8), which are indicated by solid lines, as described below with reference to FIG. 9 and the subsequent drawings.

The programmable unit 30 is connected to the arithmetic processing unit 10 via a bus BUS1, and the main memory 20 is connected to the arithmetic processing unit 10 via a bus BUS2. The input-output interfaces 50, the HDD 60, and the communication interface 70 are connected to the arithmetic processing unit 10 via a bus BUS3. For example, the bus BUS1 and the bus BUS3 are peripheral component interconnect express (PCIe) buses and the bus BUS2 is a memory bus.

The programmable unit 30 and the external memory 40 are mounted on an extended board BRD and are connected to each other via a dedicated bus BUS4. The external memory 40 holds data used for processes performed in the programmable unit 30 and data after processing. The external memory 40 is used as a frame memory illustrated in FIG. 12.

The arithmetic processing unit 10 controls the operation of the entire information processing apparatus 100A and executes a control program 22 stored in the main memory 20 to function as a feature detector 12, a throughput determiner 14, a number-of-blocks determiner 16, and a configuration controller 18. The arithmetic processing unit 10 executes other programs 24 stored in the main memory 20 to realize functions other than the feature detector 12, the throughput determiner 14, the number-of-blocks determiner 16, and the configuration controller 18. The feature detector 12, the throughput determiner 14, the number-of-blocks determiner 16, and the configuration controller 18 may be installed in the information processing apparatus 100A as hardware (circuits).

The main memory 20 is, for example, a memory module in which multiple SDRAMs are installed and has an area in which the control program 22, the other programs 24, and pieces of configuration information 26 are stored. The area in which the pieces of configuration information 26 are stored in the main memory 20 is an example of the configuration information storage unit. For example, the control program 22, the other programs 24, and the pieces of configuration information 26 are stored in the HDD 60 via a computer-readable recording medium 80, such as a CD-ROM, a DVD, or a USB memory, or a network NW and, then, are transferred to the main memory 20.

The feature detector 12 detects a feature of the data used for the multiple kinds of processes performed in the blocks UBLK. When the feature of the data used for the multiple kinds of processes is known or when the feature of the data used for the multiple kinds of processes is detected outside the information processing apparatus 100A, the feature detector 12 is omitted.

The throughput determiner 14 determines the throughput of each of the multiple kinds of processes based on the feature of the data detected by the feature detector 12. For example, the throughput determiner 14 determines the cumulative total T(n) of the blocks UBLK used to perform each of the multiple kinds of processes as the throughput. The throughput determiner 14 is an example of the first determiner. Exemplary operations of the throughput determiner 14 will be described below with reference to FIG. 9 and FIG. 10.

The number-of-blocks determiner 16 determines the allocated number A(n), which is the number of the blocks UBLK into which the logics are to be programmed for each of the multiple kinds of processes, based on the cumulative total T(n) of the blocks UBLK used for each of the multiple kinds of processes, determined by the throughput determiner 14. The number-of-blocks determiner 16 supplies the determined allocated number A(n) to the configuration controller 18 with information indicating the content of the processes. The number-of-blocks determiner 16 is an example of the second determiner. Exemplary operations of the number-of-blocks determiner 16 will be described below with reference to FIG. 9 and FIG. 10.

The configuration controller 18 reads out the configuration information 26 corresponding to each of the multiple kinds of processes performed in the programmable unit 30 from the main memory 20 based on the notification from the number-of-blocks determiner 16 and programs the configuration information 26 that is read out into the blocks UBLK. The configuration information 26 is provided for each of the multiple kinds of processes and includes the logical information indicating the logics to be programmed into each block UBLK and the connection information used to connect the multiple blocks UBLK to each other, like the configuration information 2b illustrated in FIG. 1. In addition, the configuration information 26 includes logics to calculate the minimum value through comparison of sums of absolute differences (SAD), which is calculated for each prediction mode described below with reference to FIG. 12, and logics to calculate the minimum value through comparison of the sums of absolute differences, which is calculated for each motion vector. Exemplary operation of the configuration controller 18 will be described below with reference to FIG. 9.

One of the input-output interfaces 50 is connected to an optical drive unit on which the recording medium 80, such as a DVD, is mounted or includes a connector to which a USB memory or the like is mounted. Other input-output interfaces 50 are connected to an input unit including a mouse and a keyboard (not illustrated) and an output unit, such as a display (not illustrated).

The HDD 60 stores the control program 22, the other programs 24, the pieces of configuration information 26, and so on, as described above. The communication interface 70 is connected to the network NW, such as the Internet or an intranet, and transmits and receives information to and from the network NW.

Figure 9:
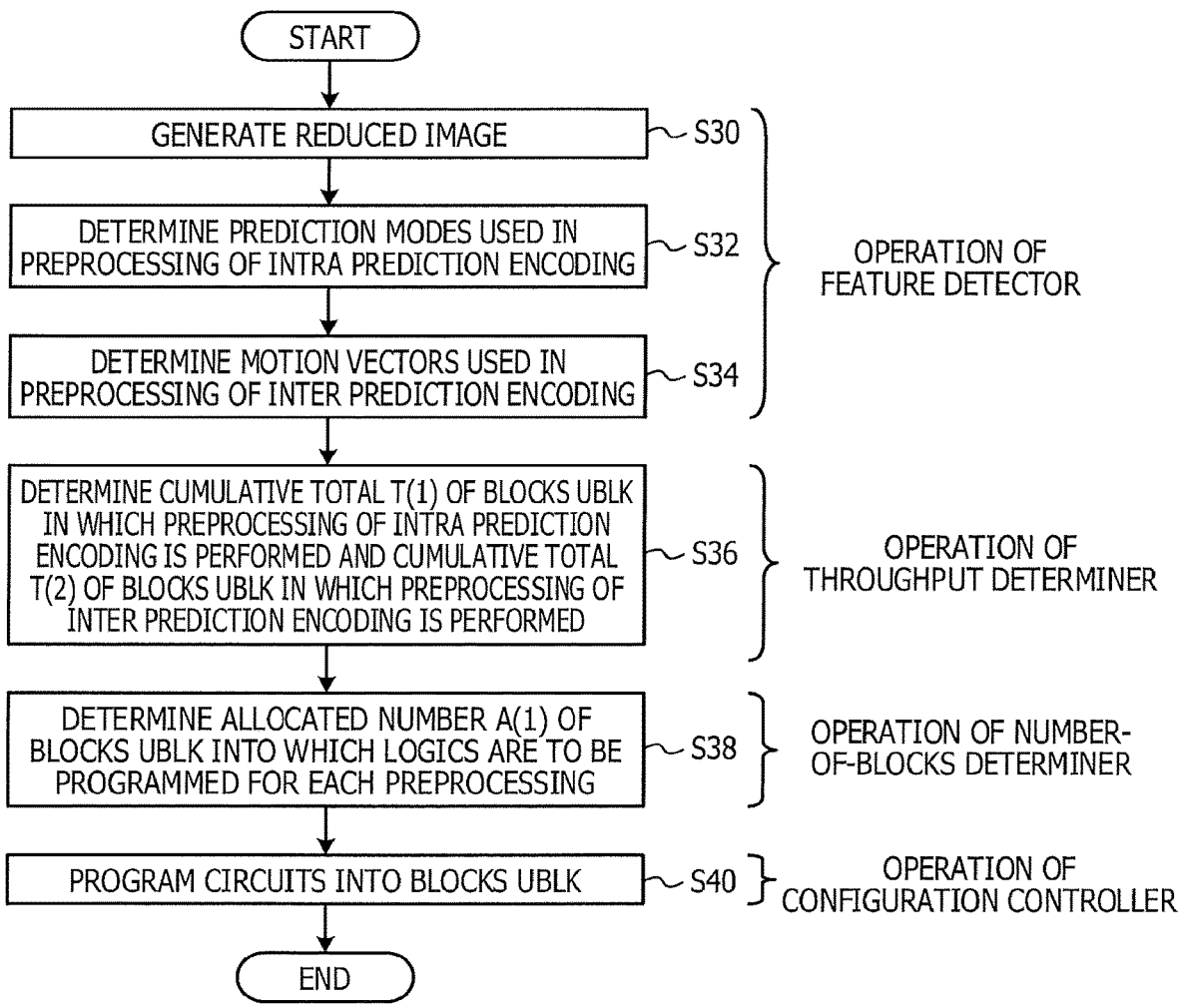
FIG. 9 is a flowchart illustrating an exemplary operational process of a feature detector, a throughput determiner, a number-of-blocks determiner, and a configuration controller illustrated in FIG. 8.

FIG. 9 is a flowchart illustrating an exemplary operational process of the feature detector 12, the throughput determiner 14, the number-of-blocks determiner 16, and the configuration controller 18 illustrated in FIG. 8. In other words, FIG. 9 illustrates an exemplary method of controlling the information processing apparatus 100A and an exemplary control program of the information processing apparatus 100A. The operational process illustrated in FIG. 9 is started upon reception of a processing request to encode each image included in a video image by the information processing apparatus 100A. The operational process illustrated in FIG. 9 may be performed by the information processing apparatus 100 illustrated in FIG. 1.

Referring to FIG. 9, in Step S30, the feature detector 12 generates a reduced image having pixels of a number smaller than that of the pixels in an image to be encoded by, for example, decimating pixels included in the image. For example, the arithmetic processing unit 10 stores image data supplied from the outside of the information processing apparatus 100A in the main memory 20. The feature detector 12 generates image data representing the reduced image using the image data stored in the main memory 20 and stores the generated image data in the main memory 20.

The image data representing an image is also simply referred to as an image in the following description. The reduced image may be generated using logics (hardware) to generate the reduced image, which are to be programmed into any of the blocks UBLK in the programmable unit 30. In this case, the processing in Step S30 performed by the control program is omitted.

In Step S32, the feature detector 12 determines prediction modes used in preprocessing of encoding through intra prediction. In the preprocessing, an intra prediction determiner 202 generated through programming of the logics into the blocks UBLK selects one of the multiple prediction modes determined in Step S32, as described below with reference to FIG. 12.

The encoding through intra prediction is a method of generating a prediction image using the values of pixels in an encoded pixel block adjacent to a pixel block to be encoded in one frame of a video image to encode the difference between the image of the pixel block to be encoded and the prediction image. The pixel block is generated by dividing the image of one frame into, for example, vertical four pixels and horizontal four pixels. The encoding through intra prediction is also referred to as intra prediction encoding in the following description.

Figure 11:
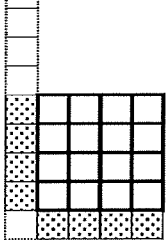
FIG. 11 illustrates exemplary prediction modes used in intra prediction encoding.

For example, the feature detector 12 analyzes the tendency of variation of the pixel values of adjacent pixels in the reduced image to detect the similarity between the pixel values. The feature detector 12 selects at least one prediction mode, among the multiple prediction modes defined in a standard used for the encoding, based on the detected similarity. For example, in H.264/Advanced Video Coding (AVC) standard, nine prediction modes are defined in accordance with the positions of pixels used in the prediction and the copying direction of the pixels. Exemplary prediction modes are illustrated in FIG. 11. For example, when the pixel values have the tendency to be similar to each other along a direction from upper left to lower right in the reduced image, the feature detector 12 selects three prediction modes (diagonal down-right, vertical-right, and horizontal-right), among the nine prediction modes illustrated in FIG. 11. In other words, the feature detector 12 detects the prediction mode for the intra prediction, which is selected based on the similarity of the pixels included in an image, as the feature of the image.

In Step S34, the feature detector 12 determines motion vectors used in the preprocessing of encoding through inter prediction. In the preprocessing, a motion vector detector 204 generated through programming of the logics into the blocks UBLK selects one of the multiple motion vectors determined in Step S34, as described below with reference to FIG. 12. Step S34 may be performed before Step S32 or may be performed in parallel with Step S32.

The encoding through inter prediction is a method of generating the prediction image using the pixel block of the image of another frame, which is similar to the pixel block of an image to be encoded between frames of a video image to encode the difference between the image of the pixel block to be encoded and the prediction image. The pixel block of the image of the other frame has the same size as that of the pixel block of the image to be encoded and the motion vector indicates the position of the pixel block for generation of the prediction image with respect to the pixel block to be encoded. The encoding through inter prediction is also referred to as inter prediction encoding in the following description.

For example, the feature detector 12 detects the tendency of the motion of an object or the like in the reduced image to be encoded using the reduced image to be encoded and the encoded reduced image. The feature detector 12 selects at least one motion vector, among the motion vectors of various lengths extending in various directions, based on the detected tendency of the motion.

In Step S36, the throughput determiner 14 determines the cumulative total T(1) of the blocks UBLK in which the preprocessing of the intra prediction encoding is performed as the throughput of the preprocessing in the intra prediction encoding. In addition, the throughput determiner 14 determines the cumulative total T(2) of the blocks UBLK in which the preprocessing of the inter prediction encoding is performed as the throughput of the preprocessing in the inter prediction encoding.

For example, when the prediction modes of a PN(1) number are capable of being processed per unit time in one block UBLK in the preprocessing of the intra prediction encoding, the cumulative total T(1) of the blocks UBLK in which the preprocessing of the intra prediction encoding is performed is calculated according to Equation (2). In Equation (2), NM(1) denotes the number of the prediction modes determined in Step S32. When the motion vectors of a number PN(2) are capable of being processed per unit time in one block UBLK in the preprocessing of the inter prediction encoding, the cumulative total T(2) of the blocks UBLK in which the preprocessing of the inter prediction encoding is performed is calculated according to Equation (3). In Equation (3), NM(2) denotes the number of the motion vectors determined in Step S34. The unit time is a processing time allocated to one stage STG in a pipeline illustrated in FIG. 12. In Equations (2) and (3), the cumulative totals T(1) and T(2) are calculated by rounding up the first decimal places of the results of the calculations.

$$T(1)=NM(1)/PN(1) \qquad (2)$$

$$T(2)=NM(2)/PN(2) \qquad (3)$$

In Step S38, the number-of-blocks determiner 16 determines the allocated number A(1) of the blocks UBLK into which the logics to perform the preprocessing of the intra prediction encoding are to be programmed based on the cumulative total T(1) determined by the throughput determiner 14. In addition, the number-of-blocks determiner 16 determines the allocated number A(2) of the blocks UBLK into which the logics to perform the preprocessing of the inter prediction encoding are to be programmed based on the cumulative total T(2) determined by the throughput determiner 14.

First, the number-of-blocks determiner 16 determines the theoretical number N(1) of the blocks UBLK in which the logics for the preprocessing of the intra prediction encoding are stored and the theoretical number N(2) of the blocks UBLK in which the logics for the preprocessing of the inter prediction encoding are stored using Equation (1). In the present embodiment, "k" in Equation (1) is equal to "2".

Next, the number-of-blocks determiner 16 rounds off the first decimal places of the theoretical numbers N(1) and N(2). The number-of-blocks determiner 16 determines the allocated number A(1) of the blocks UBLK in which the logics for the preprocessing of the intra prediction encoding are stored and the allocated number A(2) of the blocks UBLK in which the logics for the preprocessing of the inter prediction encoding are stored.

For example, if the value of the fractional portion of the theoretical number N(1) is higher than the value of the fractional portion of the theoretical number N(2), the number-of-blocks determiner 16 determines the allocated number A(1) using Equation (4) and determines the allocated number A(2) using Equation (5). If the value of the fractional portion of the theoretical number N(1) is lower than or equal to the value of the fractional portion of the theoretical number N(2), the number-of-blocks determiner 16 determines the allocated number A(1) using Equation (6) and determines the allocated number A(2) using Equation (7). In Equations (4) to (7), "ceil" denotes a CEILING function used to perform the rounding up of the first decimal place and "floor" denotes a FLOOR function used to perform the rounding down of the first decimal place.

$$A(1)=\text{ceil}(N(1)) \quad (4)$$

$$A(2)=\text{floor}(N(2)) \quad (5)$$

$$A(1)=\text{floor}(N(1)) \quad (6)$$

$$A(2)=\text{ceil}(N(2)) \quad (7)$$

The determination of the theoretical number N(i) using Equation (1) enables the preprocessing to be performed in a balanced manner in accordance with the ratio between the throughput of the preprocessing of the intra prediction encoding and the throughput of the processing of the inter prediction encoding even when the cumulative total T(n) is greater than the number of the blocks UBLK.

In Step S40, the configuration controller 18 programs the logics for the preprocessing of the intra prediction encoding into each of the blocks UBLK of the allocated number A(1) determined by the number-of-blocks determiner 16 to connect the blocks UBLK into which the logics are programmed to each other. In addition, the configuration controller 18 programs the logics for the preprocessing of the inter prediction encoding into each of the blocks UBLK of the allocated number A(2) determined by the number-of-blocks determiner 16 to connect the blocks UBLK into which the logics are programmed to each other. The above operations enable the preprocessing using the blocks UBLK to be performed. Examples of the preprocessing of the intra prediction encoding and the preprocessing of the inter prediction encoding will be described below with reference to FIG. 12.

FIG. 10 illustrates an example of the cumulative total T(n), the theoretical number N(i), and the allocated number A(n) determined from the flowchart illustrated in FIG. 9. A detailed description of the same components as those in FIG. 3 or components similar to those in FIG. 3 is omitted herein. Processing requests REQ1 to REQ3 illustrated in FIG. 10 are different from the processing requests REQ1 to REQ3 illustrated in FIG. 3. The number N of the blocks UBLK available in the preprocessing is six. For example, in the preprocessing of the intra prediction encoding, three prediction modes are capable of being processed per unit time in one block UBLK (PN(1)="3"). In the preprocessing of the inter prediction encoding, two motion vectors are capable of being processed per unit time in one block UBLK (PN(2)="2").

In an operation corresponding to the processing request REQ1, the feature detector 12 selects four prediction modes (NM(1)="4") and six motion vectors (NM(2)="6"). The throughput determiner 14 determines the cumulative total T(1)="2" using Equation (2) and determines the cumulative total T(2)="3" using Equation (3). Since the sum of the cumulative totals T(n1) and T(2) is smaller than or equal to the number N of the blocks UBLK in the processing request REQ1, the number-of-blocks determiner 16 sets the cumulative totals T(n1) and T(2) as the allocated numbers A(1) and A(2) without determining the theoretical numbers N(1) and N(2).

In an operation corresponding to the processing request REQ2, the feature detector 12 selects six prediction modes (NM(1)="6") and nine motion vectors (NM(2)="9"). The throughput determiner 14 determines the cumulative total T(1)="2" using Equation (2) and determines the cumulative total T(2)="5" using Equation (3). The number-of-blocks determiner 16 determines the theoretical number N(1)="1.7" and the theoretical number N(2)="4.3" using Equation (1). In addition, the number-of-blocks determiner 16 determines the allocated number A(1)="2" using Equation (4) and determines the allocated number A(2)="4" using Equation (5). In other words, the number-of-blocks determiner 16 rounds off the first decimal places of the theoretical numbers N(1) and N(2) to determine the allocated numbers A(1) and A(2).

The number of the motion vectors that are capable of being processed in the four blocks UBLK corresponding to the allocated number A(2) is eight, which is smaller than nine which is the number of the motion vectors selected by the feature detector 12. Although the accuracy of the encoding process using eight motion vectors is lower than the accuracy of the encoding process using nine motion vectors, a process of selecting any of the eight motion vectors is performed to give high priority to the processing time over the accuracy. When high priority is given to the accuracy over the processing time, a process of selecting any of the nine motion vectors is performed using multiple processing cycles, as in the operations illustrated in (a), (b), and (c) in FIG. 6.

In an operation corresponding to the processing request REQ3, the feature detector 12 selects seven prediction modes (NM(1)="7") and ten motion vectors (NM(2)="10"). The throughput determiner 14 determines the cumulative total T(1)="3" using Equation (2) and determines the cumulative total T(2)="5" using Equation (3). The number-of-blocks determiner 16 determines the theoretical number N(1)="2.3" and the theoretical number N(2)="3.8" using Equation (1). In addition, the number-of-blocks determiner 16 determines the allocated number A(1)="2" using Equation (6) and determines the allocated number A(2)="4" using Equation (7). In other words, the number-of-blocks determiner 16 rounds off the first decimal places of the theoretical numbers N(1) and N(2) to determine the allocated numbers A(1) and A(2).

The number of the prediction modes that are capable of being processed in the two blocks UBLK corresponding to the allocated number A(1) is six, which is smaller than seven which is the number of the prediction modes selected by the feature detector 12. Similarly, the number of the motion vectors that are capable of being processed in the four blocks UBLK corresponding to the allocated number A(2) is eight, which is smaller than ten which is the number of the motion vectors selected by the feature detector 12. A process of selecting any of the six prediction modes and any of the eight motion vectors is performed to give high priority to the processing time over the accuracy. When high priority is given to the accuracy over the processing time, a process of selecting any of the seven prediction modes and any of the ten motion vectors is performed using multiple processing cycles, as in the operations illustrated in (a), (b), and (c) in FIG. 6.

FIG. 11 illustrates exemplary prediction modes used in the intra prediction encoding. Nine kinds of prediction modes used to predict the luminance of each pixel in the pixel block of vertical four pixels and horizontal four pixels in the H.264/AVC standard are illustrated in FIG. 11. The encoding of an image is performed using a so-called raster scanning method in which the encoding of the block is repeated along a horizontal direction from upper left to lower right of the screen. Accordingly, the pixels on the left side and the pixels on the upper side of the 16 pixels to be predicted, which are surrounded by thick frames, have been encoded. In each prediction mode, the pixel values of the encoded pixels, which are shaded, are used as the prediction pixel values of the pixels to be predicted in the directions indicated by arrows.

For example, in a mode 0 (vertical), the pixel values of four pixels on the upper side of the block to be predicted are copied downward to the pixels in a prediction target block to generate the prediction image. In a mode 1 (horizontal), the pixel values of four pixels on the left side of the block to be predicted are copied rightward to the pixels in the prediction target block to generate the prediction image. In a mode 2 (DC), the average of the pixel values of eight pixels on the upper side and the left side of the block to be predicted is copied to the pixels in the prediction target block to generate the prediction image.

In a mode 4 (diagonal down-right), the pixel values of seven pixels on the upper left side of the block to be predicted are copied in a lower-right direction to the pixels in the prediction target block to generate the prediction image. In a mode 5 (vertical-right), the pixel values of four pixels on the upper side of the block to be predicted and one pixel on the left side of the block to be predicted are copied in a lower-right direction to the pixels in the prediction target block to generate the prediction image. In a mode 6 (horizontal-right), the pixel values of four pixels on the left side of the block to be predicted and one pixel on the upper side of the block to be predicted are copied in a lower-right direction to the pixels in the prediction target block to generate the prediction image.

Figure 12:
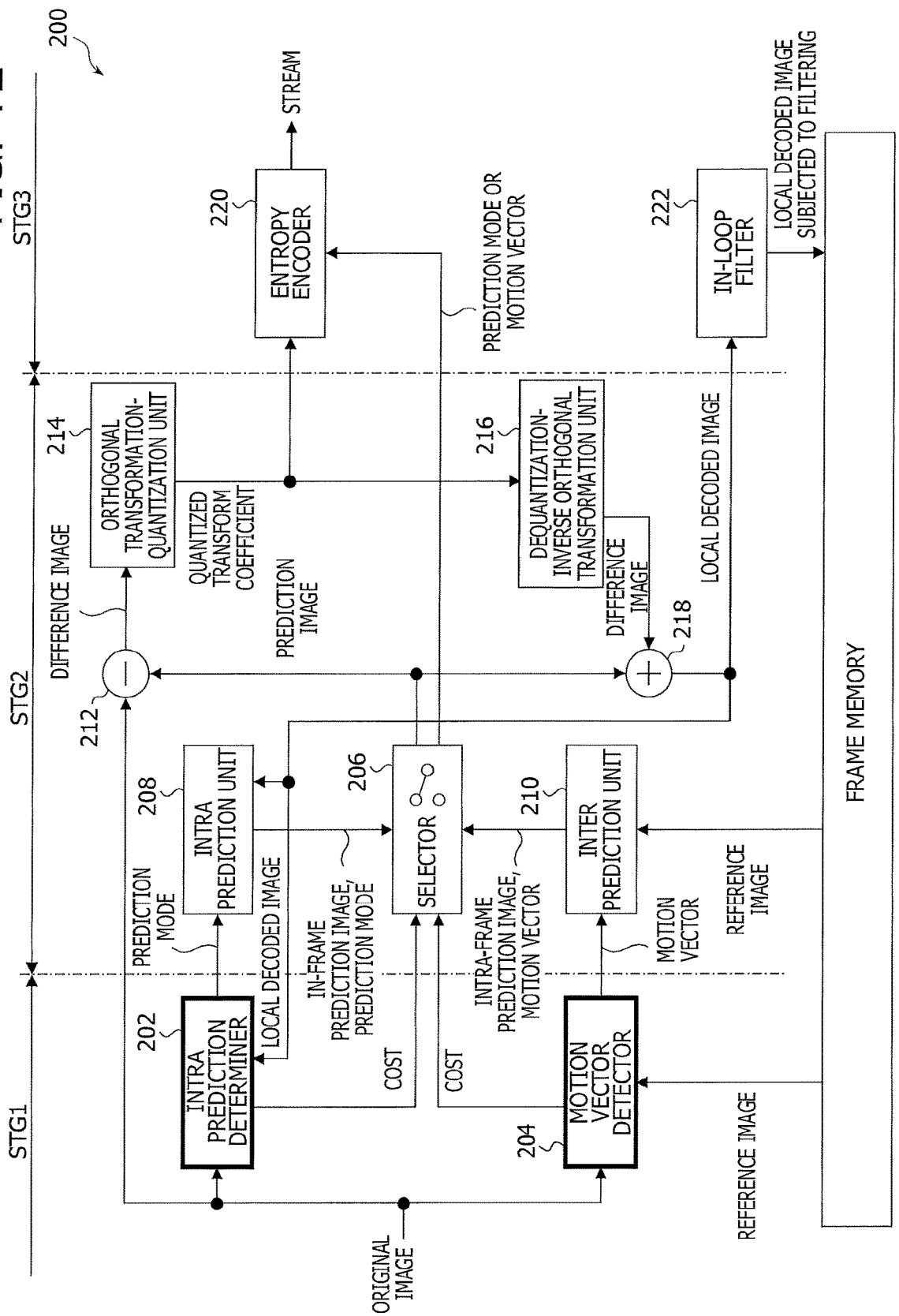
FIG. 12 illustrates an exemplary circuit programmed in a programmable unit illustrated in FIG. 8.

FIG. 12 illustrates an exemplary circuit programmed in the programmable unit 30 illustrated in FIG. 8. The circuit illustrated in FIG. 12 is an encoding circuit 200, such as a Moving Picture Experts Group (MPEG) encoder, which encodes video image data to generate a stream. The encoding circuit 200 includes three stages STG1, STG2, and STG3, the processing times of which are substantially equal to each other and which operate independently. The encoding circuit 200 performs a pipeline process in which the stages STG1, STG2, and STG3 are sequentially performed to encode the video image data.

The encoding circuit 200 includes the intra prediction determiner 202, the motion vector detector 204, a selector 206, an intra prediction unit 208, and an inter prediction unit 210. The encoding circuit 200 also includes a subtractor 212, an orthogonal transformation-quantization unit 214, a dequantization-inverse orthogonal transformation unit 216, an adder 218, an entropy encoder 220, and an in-loop filter 222. The frame memory is included in the external memory 40 illustrated in FIG. 8.

The logics of the intra prediction determiner 202 and the motion vector detector 204 surrounded by thick frames (the circuit in the stage STG1) are programmed into the blocks UBLK illustrated in FIG. 8 by performing the flowchart illustrated in FIG. 9. For example, the logics of the intra prediction determiner 202 and the motion vector detector 204 are rewritten by the configuration controller 18 for each image based on the flowchart illustrated in FIG. 9, which is performed for each image to be encoded.

In the encoding circuit 200, the logics of the components excluding the intra prediction determiner 202 and the motion vector detector 204 (the circuit in the stages STG2 and STG3) are programmed into at least one of the blocks BLK excluding the blocks UBLK. For example, the circuit in the stages STG2 and STG3 is a common circuit, which is programmed in advance before the encoding process is started and is used for the encoding of each image in a video image. The circuit in the stages STG2 and STG3 performs the encoding of an original image using the prediction mode or the motion vector determined in the preprocessing performed in the stage STG1. In other words, the information processing apparatus 100A causes the programmable unit 30 to function as an accelerator to perform the encoding of the video image.

The intra prediction determiner 202 holds the prediction modes of the NM(1)-number, which is selected by the feature detector 12 in Step S32 illustrated in FIG. 9, among the multiple (for example, nine) prediction modes defined in the standard used in the encoding. The intra prediction determiner 202 generates an in-frame prediction image from the pixel values of the pixels in a local decoded image generated by decoding the encoded data for each of the prediction modes of the NM(1)-number. The intra prediction determiner 202 determines the prediction image most similar to the image in an encoding target area in the original image in the in-frame prediction images generated in association with the multiple prediction modes and supplies the prediction mode used in the generation of the most similar prediction image to the intra prediction unit 208.

For example, the intra prediction determiner 202 calculates the sum of absolute differences between the pixel value of each pixel in the encoding target area in the original image and the pixel value of each pixel in the generated in-frame prediction image. The intra prediction determiner 202 selects the prediction mode corresponding to the image having the smallest sum of absolute differences as the prediction mode having the highest encoding efficiency and supplies the selected prediction mode to the intra prediction unit 208. In addition, the intra prediction determiner 202 adds the amount of information (for example, the bit number) of information indicating the selected prediction mode to the sum of absolute differences corresponding to the selected prediction mode to calculate the cost and supplies the calculated cost to the selector 206.

The motion vector detector 204 holds the motion vectors of the NM(2)-number, which is selected by the feature detector 12 in Step S34 illustrated in FIG. 9, among the multiple motion vectors. The motion vector detector 204 generates the in-frame prediction images of the NM(2)-number, which are indicated by the motion vectors of the NM(2)-number in the encoding target area in the original image, from a reference image read out from the frame memory. For example, the reference image is an image of one frame before, which is decoded using the encoded data, and the in-frame prediction image has the same size as that of the encoding target area.

The motion vector detector 204 detects an image most similar to the image in the encoding target area in the original image, among the in-frame prediction images of the NM(2)-number, and supplies the motion vector used in the generation of the most similar image to the inter prediction unit 210. For example, the motion vector detector 204 calculates the sum of absolute differences between the pixel value of each pixel in the encoding target area in the original image and the pixel value of each pixel in the in-frame prediction images of the NM(2)-number. The motion vector detector 204 selects the motion vector corresponding to a reference area having the smallest sum of absolute differences as the motion vector having the highest encoding efficiency and supplies the selected motion vector to the inter prediction unit 210. In addition, the motion vector detector 204 adds the amount of information (for example, the bit number) of information indicating the selected motion vector to the sum of absolute differences corresponding to the selected motion vector to calculate the cost and supplies the calculated cost to the selector 206.

The intra prediction unit 208 generates the in-frame prediction image of the encoding target area using the pixel value of a certain pixel included in the local decoded image in accordance with the prediction mode received from the intra prediction determiner 202. The intra prediction unit 208 supplies the generated in-frame prediction image to the selector 206 with the prediction mode received from the intra prediction determiner 202. The prediction mode may be directly supplied from the intra prediction determiner 202 to the selector 206.

The inter prediction unit 210 generates an intra-frame prediction image of the encoding target area using the pixel values of the pixels in the reference area indicated by the motion vector received from the motion vector detector 204, in the reference image read out from the frame memory. The inter prediction unit 210 supplies the generated intra-frame prediction image to the selector 206 with the motion vector supplied from the motion vector detector 204. The motion vector may be directly supplied from the motion vector detector 204 to the selector 206.

The selector 206 selects either of the in-frame prediction image received from the intra prediction unit 208 and the intra-frame prediction image received from the inter prediction unit 210 based on the cost and supplies the selected prediction image to the subtractor 212 and the adder 218. If the cost received from the intra prediction determiner 202 is lower than the cost received from the motion vector detector 204, the selector 206 outputs the in-frame prediction image and the prediction mode received from the intra prediction unit 208.

If the cost received from the motion vector detector 204 is lower than the cost received from the intra prediction determiner 202, the selector 206 outputs the intra-frame prediction image and the motion vector received from the inter prediction unit 210. The in-frame prediction image or the intra-frame prediction image is supplied to the subtractor 212 and the adder 218, and the prediction mode or the motion vector is supplied to the entropy encoder 220.

The subtractor 212 calculates the difference between the prediction image (the in-frame prediction image or the intra-frame prediction image) supplied from the selector 206 and the image of the encoding target area in the original image to generate a difference image. The subtractor 212 supplies the generated difference image to the orthogonal transformation-quantization unit 214.

The orthogonal transformation-quantization unit 214 generates a transform coefficient through orthogonal transformation of the difference image received from the subtractor 212, quantizes the generated transform coefficient, and supplies the quantized transform coefficient to the entropy encoder 220 and the dequantization-inverse orthogonal transformation unit 216. The entropy encoder 220 performs entropy encoding of the transform coefficient received from the orthogonal transformation-quantization unit 214 and the prediction mode or the motion vector supplied from the selector 206 and outputs a stream.

The dequantization-inverse orthogonal transformation unit 216 dequantizes the transform coefficient quantized by the orthogonal transformation-quantization unit 214 and performs inverse orthogonal transformation of the dequantized transform coefficient to decode the difference image. The dequantization-inverse orthogonal transformation unit 216 supplies the decoded difference image to the adder 218. The adder 218 adds the prediction image (the in-frame prediction image or the intra-frame prediction image) supplied from the selector 206 to the difference image supplied from the dequantization-inverse orthogonal transformation unit 216 to generate the local decoded image. The adder 218 supplies the generated local decoded image to the intra prediction determiner 202, the intra prediction unit 208, and the in-loop filter 222.

The in-loop filter 222 performs a filtering process to reduce noise in the local decoded image supplied from the adder 218 and stores the local decoded image subjected to the noise reduction in the frame memory. The local decoded image stored in the frame memory is used as the reference image by the motion vector detector 204 and the inter prediction unit 210.

Figure 13:
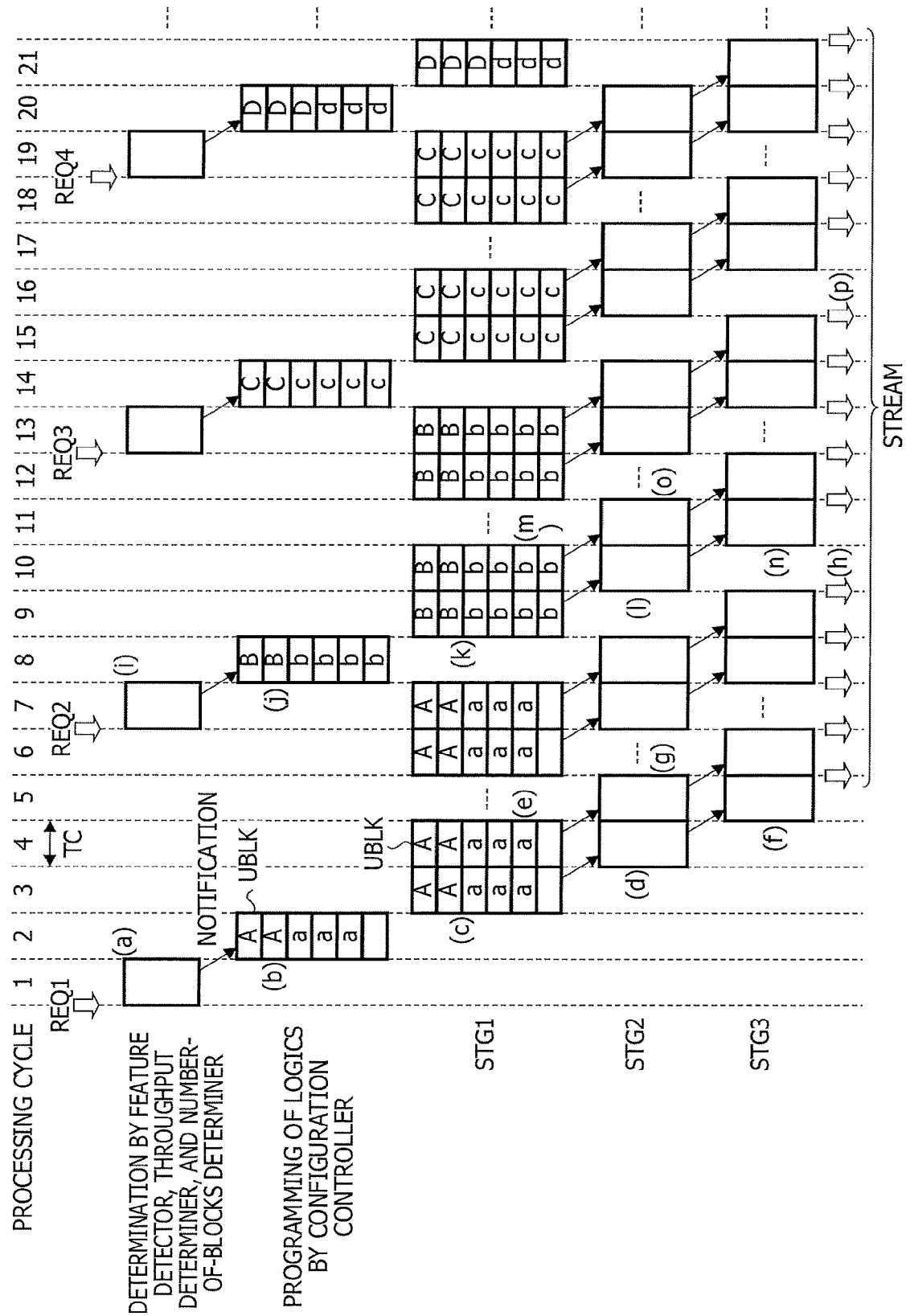
FIG. 13 illustrates exemplary operations of the information processing apparatus illustrated in FIG. 8.

FIG. 13 illustrates exemplary operations of the information processing apparatus 100A illustrated in FIG. 8. A detailed description of the same operations as those in FIG. 4 is omitted herein. FIG. 13 illustrates the operations when the information processing apparatus 100A sequentially receives the processing requests REQ1, REQ2, and REQ3 illustrated in FIG. 10.

For example, the cycle time TC allocated to each processing cycle illustrated in FIG. 13 is equal to the stage time of each of the stages STG1 to STG3 illustrated in FIG. 12. The operation times of the feature detector 12, the throughput determiner 14, and the number-of-blocks determiner 16, which operate based on the respective processing requests REQ1 to REQ3, and the programming time of the logics by the configuration controller 18 are shorter than or equal to the cycle time TC. Reference letters A, B, C, and D denote logics programmed into the blocks UBLK to realize the function of the intra prediction determiner 202 and reference letters a, b, c, and d denote logics programmed into the blocks UBLK to realize the function of the motion vector detector 204.

The feature detector 12, the throughput determiner 14, and the number-of-blocks determiner 16 perform the operations from Step S30 to Step S38 illustrated in FIG. 9 based on the processing request REQ1 to determine the allocated number A(n) of the blocks UBLK into which the logics are to be programmed ((a) in FIG. 13). The configuration controller 18 programs the logic A and the logic a into the blocks UBLK based on the allocated number A(n) determined by the number-of-blocks determiner 16 and programs the connection information between the blocks UBLK in the programmable unit 30 ((b) in FIG. 13). One of the blocks UBLK into which the logic A is programmed includes the logics to calculate the minimum value of the sums of absolute differences calculated for the respective multiple prediction modes. One of the blocks UBLK into which the logic a is programmed includes the logics to calculate the minimum value of the sums of absolute differences calculated for the respective motion vectors.

The arithmetic processing unit 10 issues an instruction to encode the image data (one frame) received with the processing request REQ1 to the programmable unit 30 after the programming of the logics into the blocks UBLK is completed. The logic A and the logic a programmed into the blocks UBLK start the process of selecting any of the prediction modes and any of the motion vectors in response to the instruction from the arithmetic processing unit 10 ((c) in FIG. 13).

The intra prediction determiner 202 realized by the logic A calculates the sum of absolute differences for each of the multiple prediction modes selected by the feature detector 12 for a macro block to be encoded in the stage STG1. In the processing request REQ1 illustrated in FIG. 10, the four sums of absolute differences corresponding to the four prediction modes are calculated using the two blocks UBLK. In addition, a process of determining the prediction mode having the smallest sum of absolute differences is performed using the logics to determine the minimum value of the sums of absolute differences programmed into either of the two blocks UBLK.

The inter prediction unit 210 realized by the logic a calculates the sum of absolute differences for each of the multiple motion vectors selected by the feature detector 12 for the macro block to be encoded in the stage STG1. In the processing request REQ1 illustrated in FIG. 10, the six sums of absolute differences corresponding to the six motion vectors are calculated using the three blocks UBLK. In addition, a process of determining the motion vector having the smallest sum of absolute differences is performed using the logics to determine the minimum value of the sums of absolute differences programmed into either of the three blocks UBLK.

In the processing cycle 4 after the processing cycle 3 in which the processes in the stage STG1 have been performed, the processes in the stage STG2 illustrated in FIG. 12 are performed ((d) in FIG. 13). In the processing cycle 4 in which the processes in the stage STG2 are performed, the processes in the stage STG1 for the next macro block are performed ((e) in FIG. 13). In the processing cycle 5 after the processing cycle 4 in which the processes in the stage STG2 have been performed, the processes in the stage STG3 illustrated in FIG. 12 are performed to generate the stream corresponding to the macro block ((f) in FIG. 13). In the processing cycle 5 in which the processes in the stage STG3 are performed, the processes in the stage STG2 for the next macro block are performed ((g) in FIG. 13). The processes in the stages STG1, STG2, and STG3 are sequentially performed through the pipeline process to sequentially generate the streams in which the image data corresponding to the processing request REQ1 is encoded ((h) in FIG. 13).

Next, the same processes as the processes corresponding to the processing request REQ1 are performed based on the processing request REQ2. Specifically, the feature detector 12, the throughput determiner 14, and the number-of-blocks determiner 16 determine the allocated number A(n) of the blocks UBLK into which the logics are to be programmed ((i) in FIG. 13). The configuration controller 18 programs the logic B and the logic b into the blocks UBLK based on the allocated number A(n) determined by the number-of-blocks determiner 16 and programs the connection information between the blocks UBLK in the programmable unit 30 ((j) in FIG. 13).

The arithmetic processing unit 10 issues an instruction to encode the image data (one frame) received with the processing request REQ2 to the programmable unit 30 after the programming of the logics into the blocks UBLK is completed. The logic B and the logic b programmed into the blocks UBLK start the process of selecting any of the prediction modes and any of the motion vectors in response to the instruction from the arithmetic processing unit 10, as in the processes performed by the logic A and the logic a ((k) in FIG. 13).

In the processing cycle 10 after the processing cycle 9 in which the processes in the stage STG1 have been performed, the processes in the stage STG2 are performed ((l) in FIG. 13). In the processing cycle 10 in which the processes in the stage STG2 are performed, the processes in the stage STG1 for the next macro block are performed ((m) in FIG. 13). In the processing cycle 11 after the processing cycle 10 in which the processes in the stage STG2 have been performed, the processes in the stage STG3 illustrated in FIG. 12 are performed to generate the stream corresponding to the macro block ((n) in FIG. 13). In the processing cycle 11, the processes in the stage STG2 for the next macro block are performed ((o) in FIG. 13). The processes in the stages STG1, STG2, and STG3 are sequentially performed through the pipeline process to sequentially generate the streams in which the image data corresponding to the processing request REQ2 is encoded ((p) in FIG. 13).

The processes based on the processing request REQ3 are performed in the same manner as in the processes based on the processing request REQ1 and REQ2 by programming the logic C and the logic c into the blocks UBLK.

The same advantages as those in the embodiment described above with reference to FIG. 1 to FIG. 7 are achieved also in the embodiment described above with reference to FIG. 8 to FIG. 13. Specifically, even when the sizes of the preprocessing of the intra prediction encoding and the preprocessing of the inter prediction encoding are varied with the image, the two preprocessings are capable of being performed in a balanced manner. In addition, even when the cumulative total T(n) of the blocks UBLK in which the respective preprocessings determined by the throughput determiner 14 are performed is greater than the number of the blocks UBLK, the preprocessings are capable of being performed in a balanced manner in accordance with the ratio of the throughputs of the preprocessings.

As a result, it is possible to select the prediction mode and the motion vector having relatively small sums of absolute differences in the stage STG1 to improve the efficiency of the encoding of an image, compared with the related art, in the stages STG2 and STG3. In other words, it is possible to improve the processing performance in the encoding process of a video image, compared with the related art.

In the embodiment described above with reference to FIG. 8 to FIG. 13, the feature detector 12 determines the number of the prediction modes and the number of the motion vectors for each image and the encoding process is performed for each macro block in the stages STG1, STG2, and STG3 illustrated in FIG. 12. Accordingly, it is possible to decrease the percentage of the time to perform the operational process illustrated in FIG. 9 in the encoding process, compared with the case in which the number of the prediction modes and the number of the motion vectors are determined for each macro block. For example, determining the number of the prediction modes and the number of the motion vectors using the reduced image enables the detection of the prediction modes of a certain number and the motion vectors of a certain number to be performed within the processing cycle of the encoding process. As a result, it is possible to improve the efficiency of the encoding, compared with the related art.

The features and the advantages of the embodiments will be apparent from the above detailed description. This intends to extend the range of the claims to the features and the advantages of the above embodiments without departing from the spirit and scope the claims. It will be further understood by those skilled in the art that various changes and modifications may be made. Accordingly, it is not intended to limit the range of the embodiments having inventiveness to the one described above and the embodiments may be based on appropriate modifications and equivalents included in the range disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a programmable circuit that includes multiple circuit areas into which logics are capable of being programmed, each circuit area of the multiple circuit areas being each part of the programmable circuit;
   a memory; and
   a processor coupled to the memory and the processor configured to:
   receive a request including information concerning a first process and a second process,
   calculate a first throughput corresponding to the first process and a second throughput corresponding to the second process based on data to be used in each of the first process and the second process,
   determine a first number of circuit areas in which the first process is to be performed and a second number of circuit areas in which the second process is to be performed based on the first throughput and the second throughput, and
   program first logics in first one or more circuit areas, whose number of circuit areas is adjusted to a number calculated by using the first number and the second number, among the multiple circuit areas to perform the first process, and program second logics in second one or more circuit areas, whose number of circuit areas is adjusted to a number calculated by using the first number and the second number, among the multiple circuit areas to perform the second process, the first one or more circuit areas corresponding to the first number, the second one or more circuit areas corresponding to the second number.

2. The information processing apparatus according to claim 1,
   wherein the first throughput indicates a cumulative total of circuit areas in which the first process is to be performed and the second throughput indicates a cumulative total of circuit areas in which the second process is to be performed, and
   wherein the first number and the second number are determined in accordance with a ratio between the cumulative total of the circuit areas in which the first process is to be performed and the cumulative total of the circuit areas in which the second process is to be performed.

3. The information processing apparatus according to claim 1,
   wherein the first process and the second process are preprocessing of intra prediction in which a pixel value is predicted in a frame and preprocessing of inter prediction in which a motion of an image is predicted between frames respectively, the preprocessing of intra prediction and the preprocessing of inter prediction being included in an encoding process of a video image,
   wherein the calculation of the first throughput and the second throughput includes: calculating a number of prediction modes used in the preprocessing of the intra prediction on the basis of a feature of image data for the video image, calculating throughput of the preprocessing of the intra prediction on the basis of the calculated number of the prediction modes, calculating a number of motion vectors used in the preprocessing of the inter prediction on the basis of the feature of the image data, and calculating throughput of the preprocessing of the inter prediction on the basis of the calculated number of the motion vectors, and
   wherein the determination of the first number and the second number includes calculation of a number of circuit areas into which the logics to perform the preprocessing of the intra prediction are to be programmed and a number of circuit areas into which the logics to perform the preprocessing of the inter prediction are to be programmed on the basis of the throughputs of the preprocessing of the intra prediction and the preprocessing of the inter prediction.

4. The information processing apparatus according to claim 3,
   wherein the preprocessing of the intra prediction, the intra prediction, the preprocessing of the inter prediction, and the inter prediction are executed for each pixel group in multiple pixels included in an image included in the video image.

5. The information processing apparatus according to claim 1, the processor further configured to detect features of data used in the first process and the second process,
   wherein the first throughput and the second throughput are calculated based on the detected features.

6. The information processing apparatus according to claim 1, the processor further configured to store the first logics, the second logics and connection information in the storage unit, the connection information indicating connections between circuit areas included in the first one or more circuit areas and the second one or more circuit areas.

7. The information processing apparatus according to claim 1,
   wherein the first process and the second process are to be performed in parallel in the programmable circuit.

8. The information processing apparatus according to claim 1,
   wherein the first process and the second process are performed, in one of multiple processing stages included in a pipeline process, within a processing time of the one of multiple processing stages.

9. The information processing apparatus according to claim 1, wherein the first process and the second process are to be performed in parallel in a first processing stage included in a pipeline process.

10. The information processing apparatus according to claim 1,
wherein the first process and the second process are performed in series in different processing stages included in a pipeline process respectively.

11. An information processing method comprising:
receiving a request including information concerning a first process and a second process,
calculating a first throughput corresponding to the first process and a second throughput corresponding to the second process based on data to be used in each of the first process and the second process,
determining a first number of circuit areas in which the first process is to be performed and a second number of circuit areas in which the second process is to be performed based on the first throughput and the second throughput, and
programming first logics in first one or more circuit areas among multiple circuit areas included in a programmable circuit, whose number of circuit areas is adjusted to a number calculated by using the first number and the second number, to perform the first process, and programming second logics in second one or more circuit areas among the multiple circuit areas, whose number of circuit areas is adjusted to a number calculated by using the first number and the second number, the first one or more circuit areas corresponding to the first number, the second one or more circuit areas corresponding to the second number, the programmable circuit including the multiple circuit areas into which logics are capable of being programmed, each circuit area of the multiple circuit areas being each part of the programmable circuit.

12. A non-transitory computer-readable recording medium storing a program that causes a computer to execute a process comprising:
receiving a request including information concerning a first process and a second process,
calculating a first throughput corresponding to the first process and a second throughput corresponding to the second process based on data to be used in each of the first process and the second process,
determining a first number of circuit areas in which the first process is to be performed and a second number of circuit areas in which the second process is to be performed based on the first throughput and the second throughput, and
programming first logics in first one or more circuit areas among multiple circuit areas included in a programmable circuit, whose number of circuit areas is adjusted to a number calculated by using the first number and the second number, to perform the first process, and programming second logics in second one or more circuit areas among the multiple circuit areas, whose number of circuit areas is adjusted to a number calculated by using the first number and the second number, the first one or more circuit areas corresponding to the first number, the second one or more circuit areas corresponding to the second number, the programmable circuit including the multiple circuit areas into which logics are capable of being programmed, each circuit area of the multiple circuit areas being each part of the programmable circuit.

* * * * *